(12) United States Patent
Ide et al.

(10) Patent No.: US 7,310,460 B2
(45) Date of Patent: Dec. 18, 2007

(54) OPTICAL DEVICE

(75) Inventors: Akiyoshi Ide, Kasugai (JP); Yasunori Iwasaki, Nishikasugai-gun (JP); Masashi Fukuyama, Inuyama (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/446,092

(22) Filed: Jun. 2, 2006

(65) Prior Publication Data

US 2006/0233495 A1 Oct. 19, 2006

Related U.S. Application Data

(63) Continuation of application No. PCT/JP2004/018220, filed on Dec. 7, 2004.

(30) Foreign Application Priority Data

Dec. 8, 2003 (JP) ............................. 2003-408939

(51) Int. Cl.
*G02B 6/00* (2006.01)
*G02B 6/26* (2006.01)

(52) U.S. Cl. ............................. 385/16; 385/17; 385/18; 385/19; 385/140

(58) Field of Classification Search ............ 385/16–21, 385/140
See application file for complete search history.

(56) References Cited

U.S. PATENT DOCUMENTS

| | | | | |
|---|---|---|---|---|
| 4,505,539 A | * | 3/1985 | Auracher et al. .............. | 385/19 |
| 4,720,172 A | * | 1/1988 | Baker ......................... | 349/196 |
| 4,988,157 A | * | 1/1991 | Jackel et al. .................. | 385/17 |
| 5,024,497 A | * | 6/1991 | Jebens ......................... | 385/16 |
| 5,440,654 A | * | 8/1995 | Lambert, Jr. ................. | 385/17 |
| 5,699,462 A | * | 12/1997 | Fouquet et al. ............... | 385/18 |
| 5,832,149 A | * | 11/1998 | Omizu et al. ................. | 385/20 |
| 6,266,461 B1 | * | 7/2001 | Takahashi .................... | 385/17 |
| 6,782,185 B2 | * | 8/2004 | Katayama et al. .......... | 385/140 |
| 6,832,028 B2 | * | 12/2004 | Gu et al. ....................... | 385/41 |
| 6,882,763 B2 | * | 4/2005 | Kuhara ....................... | 385/14 |
| 2002/0003921 A1 | * | 1/2002 | Horino et al. ............... | 385/22 |
| 2002/0009256 A1 | * | 1/2002 | Chertkow et al. ........... | 385/18 |
| 2002/0031324 A1 | * | 3/2002 | Cao et al. .................... | 385/140 |
| 2002/0041726 A1 | * | 4/2002 | Thackara .................... | 385/16 |
| 2002/0061159 A1 | * | 5/2002 | Dahmani et al. ............. | 385/18 |

(Continued)

FOREIGN PATENT DOCUMENTS

JP 62-9312 1/1987

(Continued)

*Primary Examiner*—Michelle Connelly-Cushwa
*Assistant Examiner*—Rhonda S. Peace
(74) *Attorney, Agent, or Firm*—Burr & Brown

(57) ABSTRACT

A light controlling means includes a shutter member and an actuator. The shutter member is disposed in a slit and has a function to shut off signal light propagated in the light path of an optical fiber array. The actuator is constructed to drive and move the shutter member in a vertical direction. The shutter member is fixed to one end of the actuator and positioned substantially in alignment with an inclination angle of the slit. Further, a base member of the shutter member is made from transparent quartz glass. A light reflecting film is formed on a portion of one of the plate surfaces of the shutter member, on a surface opposite the optical axis of a light exit portion.

8 Claims, 27 Drawing Sheets

U.S. PATENT DOCUMENTS

| | | |
|---|---|---|
| 2003/0012545 A1* | 1/2003 | Bellman et al. ............. 385/140 |
| 2003/0021521 A1* | 1/2003 | Hayashi et al. ............... 385/16 |
| 2003/0147583 A1* | 8/2003 | Saito ........................... 385/17 |
| 2004/0008921 A1* | 1/2004 | Kanie et al. ................... 385/14 |
| 2004/0022482 A1* | 2/2004 | Blair et al. .................... 385/18 |
| 2004/0028322 A1* | 2/2004 | Sprague et al. ............... 385/23 |
| 2004/0228571 A1* | 11/2004 | Pan et al. ...................... 385/16 |
| 2005/0025412 A1* | 2/2005 | Hirata et al. ................... 385/18 |
| 2005/0219457 A1* | 10/2005 | Crossland et al. .......... 349/196 |

FOREIGN PATENT DOCUMENTS

| | | |
|---|---|---|
| JP | 2-43514 | 2/1990 |
| JP | 2-247607 | 10/1990 |
| JP | 10-020348 | 1/1998 |
| JP | 11-119129 | 4/1999 |
| JP | 11-174389 | 7/1999 |
| JP | 2003-185945 | 7/2003 |
| JP | 2003-526815 | 9/2003 |
| JP | 2004-102172 | 4/2004 |
| JP | 2004-317642 | 11/2004 |
| WO | 01/67159 | 9/2001 |
| WO | 02/103432 | 12/2002 |

* cited by examiner

OPTICAL DEVICE

BACKGROUND OF THE INVENTION

Field of the Invention

The present invention relates to an optical device with a fixed optical fiber array having one or more optical fibers, and more particularly to an optical device having a function to shut off or attenuate signal light that is propagated through the optical fiber array.

With recent increases in optical transmission capacity, dense wavelength division multiplexing (DWDM) as its core technology has seen widespread use in the art. Attention is drawn to variable optical attenuators that are used for flattening gain characteristics and wavelength characteristics. A variable optical attenuator has a function to adjust light, which is propagated through as many optical fibers as the number of preset channels at respective different wavelengths corresponding to the channels, to obtain a desired light intensity in each channel for thereby reducing light intensity differences between the channels after the light is amplified.

As shown in Japanese Laid-Open Patent Publication No. 2003-185945, for example, a conventional variable optical attenuator has a first optical fiber with a ferrule mounted on an end thereof, a second optical fiber with a ferrule mounted on an end thereof, first and second optical lenses disposed between the end of the first optical fiber and the second optical fiber, and a filter member retractably mounted between the first optical lens and the second optical lens.

The variable optical attenuator is arranged such that light emitted from the first optical fiber through the ferrule is converted by the first optical lens into parallel light, which is converged by the second optical lens and introduced through the ferrule into the second optical fiber. When the filter member is moved, transmission of light traveling from the first optical fiber 50a to the second optical fiber 50b is changed, thereby altering the attenuation of the light.

However, the conventional variable optical attenuator is problematic in that the size thereof is large because two optical lenses need to be placed between the ends of the optical fibers, and a space is required in order for the filter member to be retractably positioned between the two optical lenses.

There has been proposed a variable optical attenuator having a Y-branch waveguide disposed between the ends of optical fibers and having a refractive index variable based on a thermooptical effect or an electrooptical effect. While the refractive index of one of the waveguides of the Y-branch waveguide is changed, the intensity of light coupled to the other output waveguide is made variable (see, for example, Japanese Laid-Open Patent Publication No. 10-20348). The variable optical attenuator is advantageous in that its size is reduced because the optical waveguides may be disposed between the optical fibers, instead of two optical lenses and a filter member.

Recently, there has been a growing need for optical add/drop modules (OADM) for dropping and adding certain wavelengths. Although various types of OADM have been studied, wavelength blocking type products have attracted attention in recent years. According to this type of product, wavelengths that have been dropped from the trunk line are blocked on the trunk line from interfering with a subsequently added signal having the same wavelength. This wavelength blocking type of product is advantageous in that the number of parts is reduced.

This type of product comprises a demultiplexer for demultiplexing multiplexed light, an optical switch for blocking (attenuating) the demultiplexed light of respective wavelengths, and a multiplexer for remultiplexing the light of the respective wavelengths. In recent years, there has been a demand for small-size, low-cost products, which act as an optical switch for blocking light of respective wavelengths.

Heretofore, there have been devised a waveguide (see, for example, Japanese Laid-Open Patent Publication No. 11-174389) and an attenuator and switch employing an optical lens system (see, for example, Japanese Laid-Open Patent Publication No. 2003-526815 (PCT application)).

However, the conventional variable optical attenuator, based on use of the thermooptical or electrooptical effect, has characteristics failing to fully satisfy required specifications, because its polarization characteristics become poor upon attenuation, and it consumes a large amount of electric energy. The conventional variable optical attenuator is also disadvantageous in that it suffers from limitations in terms of space efficiency, and it is highly costly since the optical waveguide must be placed between optical fibers.

The optical switch as applied to an OADM entails a high cost when it is connected to optical fibers if the optical switch is of the waveguide type. If the optical switch as applied to an OADM employs an optical lens system, then the cost of the optical lens itself, and the positional adjustments required therefor, also present obstacles with respect to efforts to reduce the cost of the optical switch.

SUMMARY OF THE INVENTION

It is an object of the present invention to provide an optical device, which is reduced in size and cost, and which is capable of controlling light (blocking or attenuating light) without impairing the characteristics of signal light.

Another object of the present invention is to provide an optical device, which has an integral assembly comprising a monitor and a light controller, thereby making the optical device smaller in size and lowering the cost of the optical device.

An optical device according to the present invention comprises an optical fiber array having at least one optical fiber, a slit defined in an optical path of the optical fiber array, and a light control means disposed in or near the slit for attenuating or blocking light that is propagated through the optical path of the optical fiber array.

With the above arrangement, the optical device is small in size and low in cost, and is capable of controlling (blocking or attenuating) light without impairing the characteristics of signal light.

In the above structure, the light control means may have an additional member disposed in the slit and having a function to attenuate or block light that is propagated through the optical path of the optical fiber array, wherein an actuating means is provided for actuating the additional member. As the optical device does not require a plurality of optical lenses, the optical device is advantageously reduced in size and cost. The slit has a width, which should preferably be 30 µm or greater and 200 µm or smaller.

According to the present invention, the light control means may actuate the additional member into and out of the optical path in the slit. Since an attenuating function is performed by a mechanical shutter, the characteristics of signal light are not impaired.

In the above structure, the actuating means includes a mechanism for moving the additional member based on the displacement of a piezoelectric device. Inasmuch as the additional member is actuated when the material of the piezoelectric device is expanded and contracted, long-term reliability of the actuated member is not impaired. The additional member may include a light reflecting film disposed partially or entirely thereon.

If at least one optical fiber of the optical fiber array has a portion for emitting light into the slit, which is defined as a light exit portion thereof, and a portion for receiving light through the slit, which is defined as a light entrance portion, then the light control means may include an actuating means for elastically deforming the light exit portion and/or the light entrance portion in order to shift an optical axis thereof.

Since the optical device does not require a plurality of optical lenses, the optical device is advantageously reduced in size and cost. Because no additional member needs to be inserted in the slit, the width of the slit may be reduced, and signal light can be controlled (blocked or attenuated) without impairing the characteristics thereof.

In the above structure, the actuating means may have a mechanism for elastically deforming the light exit portion and/or the light entrance portion based on a displacement of a piezoelectric device. Inasmuch as the light exit portion and/or the light entrance portion is actuated when the material of the piezoelectric device is expanded and contracted, long-term reliability of the actuated member is not impaired.

If the optical device includes a base having at least one V-groove defined therein, wherein the optical fiber array is disposed in the V-groove, then the base may have a recess defined in a portion thereof, where the slit of the optical fiber array is positioned, and the recess may have a bottom positioned downwardly of a lower surface of the optical fiber array.

Even though the base is provided with the optical fiber array arranged therein, the light exit portion and/or the light entrance portion of the optical fiber can easily be elastically deformed by the piezoelectric device.

Preferably, an adhesive for fixing the optical fiber should be present in a boundary region between the recess and the light exit portion, as well as in a boundary region between the recess and the light entrance portion. When the light exit portion and/or the light entrance portion is elastically deformed as described above, a stress concentration occurs as a result of a bending load exerted at the pivot of the light exit portion and/or the light entrance portion. Such stress concentration is liable to cause disconnections during continuous operation over a prolonged period of time. However, the fiber fixing adhesive, which is present in the boundary regions, functions as a cushioning member at the pivot, for reducing stress concentration, and thereby increasing the lifetime of the optical device.

In each of the above embodiments, at least the slit should preferably be filled with an adhesive having a low viscosity and functioning as a refractive index matching agent, for thereby controlling (blocking or attenuating) signal light without impairing the characteristics thereof. In addition, the additional member can easily be positioned into and taken out of the slit. Further, the light exit portion and the light entrance portion can easily be elastically deformed, leading to easier and more accurate light control.

In the above embodiments, the light control means may comprise a liquid crystal device whose transparency changes depending on an electric signal applied thereto.

The transparency of the liquid crystal device changes depending on an attribute (voltage level, current level, pulse duration, etc.) of the electric signal supplied to the liquid crystal device, thus making it possible to realize highly accurate variable light attenuation. The optical device can also easily control the transmission and blocking of light, thereby serving as a high-performance optical switch.

Moreover, because the liquid crystal device is disposed in the slit, the optical device is small in size and low in cost. Since mechanically actuated members are not used, the optical device has long-term reliability.

If at least one optical fiber of the optical fiber array has a portion for emitting light into the slit, which is defined as a light exit portion, and a portion for receiving light through the slit, which is defined as a light entrance portion, then the optical device may further comprise a first transparent electrode disposed on at least an upper surface of the light exit portion and electrically connected to a transparent electrode of the liquid crystal device, and a second transparent electrode disposed on at least an upper surface of the light entrance portion and electrically connected to another transparent electrode of the liquid crystal device. With this arrangement, it is easy to supply electric signals from an external source to the liquid crystal device disposed in the slit.

In the above structure, the first transparent electrode may extend from the upper surface of the light exit portion to the end face thereof, which faces the slit. The second transparent electrode may extend from the upper surface of the light entrance portion to the end face thereof, which faces the slit.

In the above structure, furthermore, the optical device may further comprise a board disposed over the slit of the optical fiber array, the board having a first upper electrode and a second upper electrode which are disposed on an upper surface thereof, a first through hole electrically connecting the first transparent electrode to the first upper electrode, and a second through hole electrically connecting the second transparent electrode to the second upper electrode.

Thus, the liquid crystal device may be supplied with electric signals through the upper electrodes disposed on the upper surface of the board. Because the board is mounted on the liquid crystal device, the wiring paths from the liquid crystal device to the upper electrodes are reduced in length, thereby reducing the introduction of high-frequency noise.

The optical device may further comprise a resin layer disposed in covering relation to at least an electric junction between the first transparent electrode and the transparent electrode of the liquid crystal device, and an electric junction between the second transparent electrode and the other transparent electrode of the liquid crystal device. The resin layer is effective to avoid electromagnetic interference with surrounding circuits and to reduce introduction of noise, and also to make the optical device highly resistant to humidity.

An optical device according to the present invention comprises an optical fiber array having at least one optical fiber, a monitor for detecting branched light from signal light that is propagated through an optical path of the optical fiber array and for converting the detected branched light into an electric signal depending on the intensity of the branched light, and a light controller for controlling the signal light that is propagated through the optical path of the optical fiber array based on the electric signal from the monitor, the light controller having a light control means disposed in or near the slit for attenuating or blocking light that is propagated through the optical path of the optical fiber array.

In the optical device thus constructed, the monitor for monitoring signal light and the light controller for controlling signal light are integrally combined with each other. The optical device has multiple functions, while being both small in size and low in cost.

Because the light controller has the slit defined in the optical fiber array and the light control means disposed in or near the slit, the optical device does not require a plurality of optical lenses, and is advantageously reduced in size and cost. Furthermore, the optical device is capable of controlling (blocking or attenuating) light without impairing the characteristics of signal light.

In the above structure, the monitor may have a second slit defined in the optical path of the optical fiber array, a branching member inserted in the second slit for branching signal light propagated through the optical path of the optical fiber array, and a light detecting device for detecting branched light from the branching member and converting the detected branched light into an electric signal depending on the intensity of the branched light.

The optical device may include a board disposed on the optical fiber array, wherein the light control means of the light controller and the light detecting device of the monitor are mounted on the board. With this arrangement, the optical device, which includes the monitor and the light controller for the signal light, can further be reduced in size.

A polarizer disposed in the optical path of branched light within the monitor can transmit only a certain polarized component of the branched light, so that the monitor can be used in various detecting processes using the branched light. A wavelength filter disposed in the optical path allows the monitor to detect only a certain wavelength of the branched light. A variable-wavelength filter disposed in the optical path allows the monitor to serve as a variable-wavelength monitor, and is capable of detecting each of various wavelengths of the branched light in series. A lens disposed in the optical path is capable of radiating the branched light into space, and makes it possible to fabricate a spatial optical system. Specifically, if a diffraction grating is provided in combination with the lens, then since the diffraction angle of diffracted light differs depending on wavelength, a PD array comprising an array of PDs and placed at a position where the diffracted light arrives allows a wavelength-dependent monitor to be fabricated. The diffraction grating or the lens may be disposed at a tilted orientation.

The monitor may include a plurality of slits defined in one or more optical fibers of the optical fiber array, wherein filters corresponding to different wavelengths are inserted respectively in the slits so that the monitor can also be used as a demultiplexer. Lenses may be disposed in the respective optical paths of branched light, whereby branched light emitted from the lenses is applied respectively to individual optical fibers so as to be led to an external circuit system.

As described above, the optical device according to the present invention is reduced in size and cost, and is capable of controlling light (blocking or attenuating light) without impairing the characteristics of signal light.

The optical device according to the present invention includes the monitor and the light controller as an integral assembly, making the optical device both smaller in size and lower in cost.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Optical devices according to embodiments of the present invention, which are incorporated in an 8-channel in-line optical fiber array, shall be described below with reference to FIGS. 1 through 27.

Figure 1:
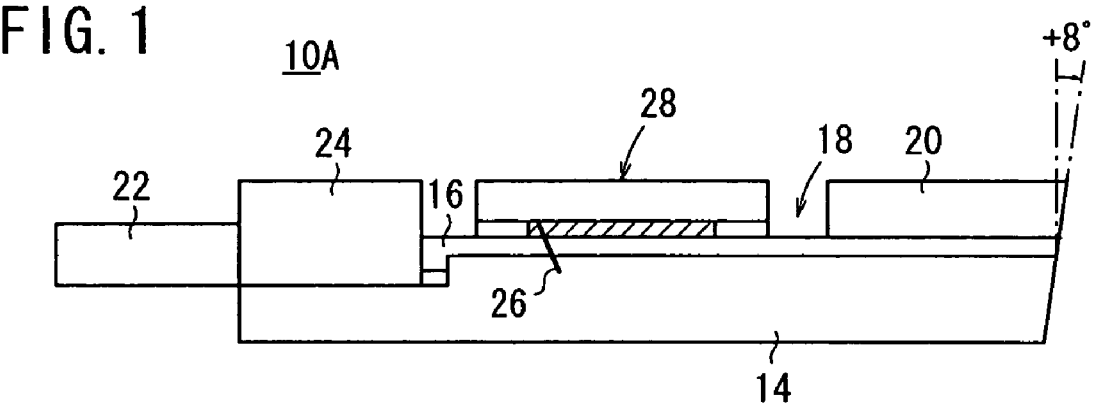
FIG. 1 is a view showing the structure of an optical device according to a first embodiment.

As shown in FIG. 1, an optical device 10A according to a first embodiment includes a glass substrate 14 with a plurality of V-grooves 12 (see FIG. 11) defined in an upper surface thereof, an optical fiber array 18 comprising a plurality of optical fibers 16 fixedly disposed in the V-grooves 12 of the glass substrate 14, a first holder substrate 20 disposed near one end of the glass substrate 14 for holding ends of the optical fibers 16 against the glass substrate 14, and a second holder substrate 24 disposed near the other end of the glass substrate 14 for holding a covered portion 22 of the optical fiber array 18 against the glass substrate 14.

In the illustrated embodiment, the optical fiber array 18 comprises eight optical fibers 16. Therefore, each optical fiber 16 makes up one of the eight optical fibers. However, the optical fiber array 18 may comprise a single optical fiber 16, wherein each optical fiber 16 implies a single optical fiber in such a case.

The end face of the first holder substrate 20, the end face of the optical fiber array 18, and one of the end faces of the glass substrate 14 are ground into a slanted surface, having an angle of about +8° with respect to the vertical direction.

The optical device 10A according to the first embodiment includes a slit 26 defined centrally in the glass substrate 14 extending from the upper surfaces of the optical fibers 16 into the glass substrate 14, and a light control means 28 disposed either within the slit 26 or near the slit 26, for attenuating or blocking signal light propagated through optical paths of the optical fiber array 18.

Figure 2:
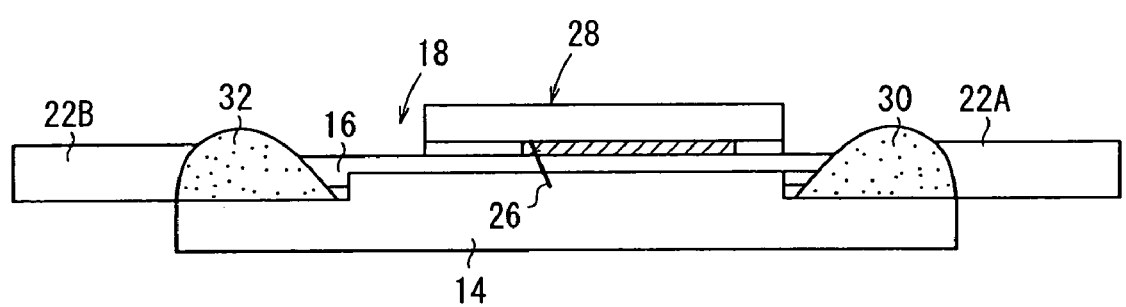
FIG. 2 is a view showing the structure of an optical device according to a second embodiment.

An optical device 10B according to a second embodiment has essentially the same structure as the first embodiment, but differs therefrom in that, as shown in FIG. 2, the end of the optical fiber array 18 is not fixed to the glass substrate 14. Rather, a portion (bare portion) thereof, which is free of a covering, of the optical fiber array 18 in its longitudinal direction is fixed to the glass substrate 14.

Specifically, a covered portion 22A of the optical fiber array 18 is fixed to the glass substrate 14 by a fixing adhesive 30 that is applied to the glass substrate 14 near one end thereof, and another covered portion 22B of the optical fiber array 18 is fixed to the glass substrate 14 by a fixing adhesive 32 that is applied to the glass substrate 14 near the other end thereof. The bare portion of the optical fiber array 18 is fixedly disposed in the V-grooves 12 (see FIG. 11) of the glass substrate 14.

The optical device 10B according to the second embodiment also has a slit 26 defined centrally in the glass substrate 14 and extending from the upper surfaces of the optical fibers 16 into the glass substrate 14. A light control means 28 is disposed either in the slit 26 or near the slit 26 for attenuating or blocking signal light propagated through optical paths of the optical fiber array 18. The light control means 28 is provided in combination with the respective channels.

Figure 3:
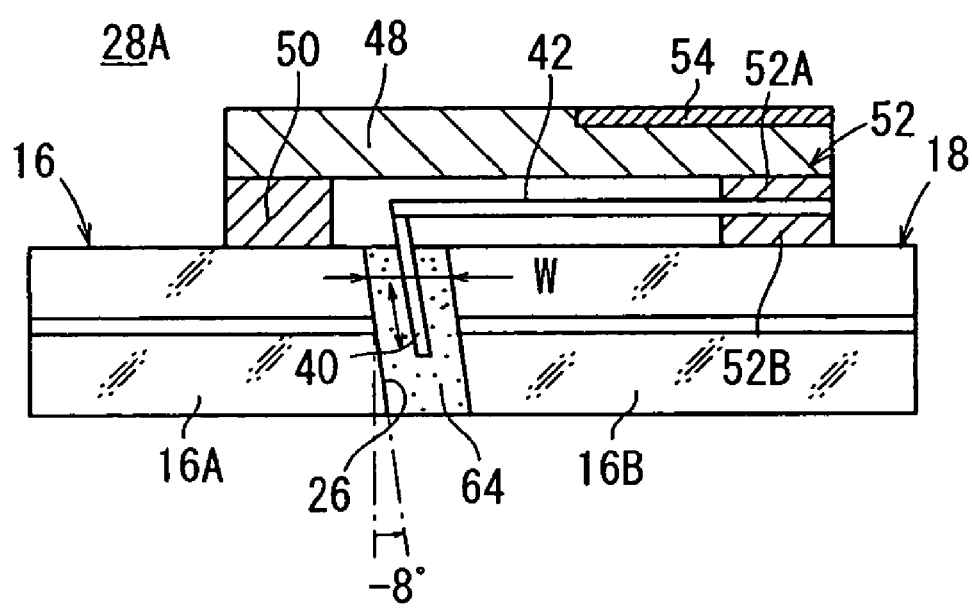
FIG. 3 is a cross-sectional view showing a light control means according to a first specific example.
Figure 9:
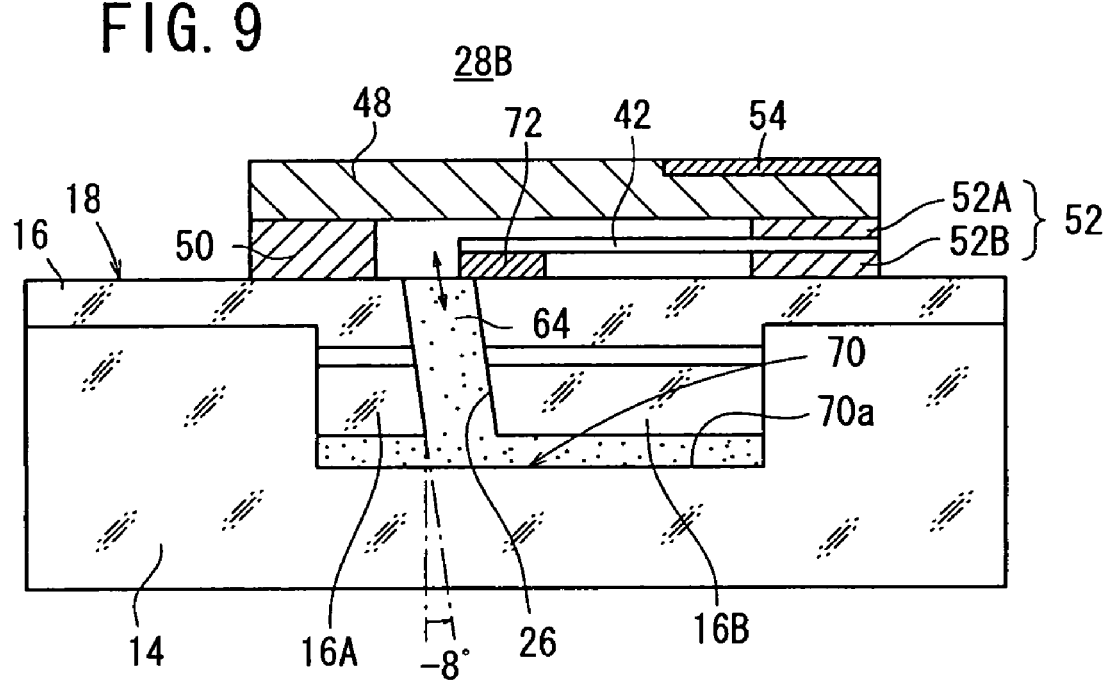
FIG. 9 is a cross-sectional view showing a light control means according to a second specific example.

The slit 26 is tilted at a predetermined angle with respect to the vertical direction. As shown in FIGS. 3 and 9, for example, the tilt angle should preferably be −6° or greater with respect to the vertical direction in order to avoid return of the signal light through the slit 26. In the first and second embodiments, the slit 26 is tilted at an angle of about −8°.

Various specific examples of the light control means 28 shall be described below with reference to FIGS. 3 through 19. Within the optical fibers 16 of the optical fiber array 18, a portion for emitting light into the slit 26 is defined as a light exit portion 16A, and a portion for receiving light through the slit 26 is defined as a light entrance portion 16B.

Figure 4:
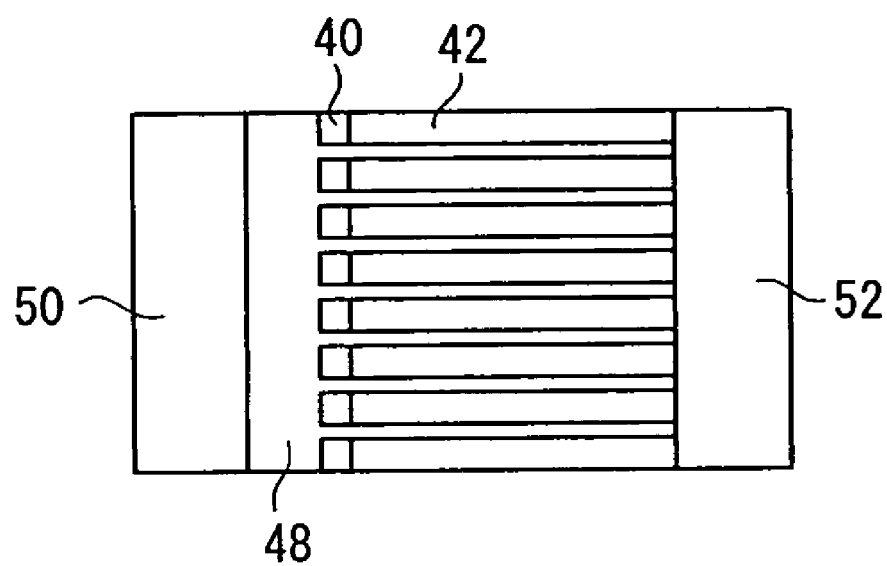
FIG. 4 is a bottom view of an actuator.

As shown in FIGS. 3 and 4, a light control means 28A according to a first specific example has shutter members 40 and actuators 42. The shutter members 40 are disposed in the slit 26 and have a function to shut off signal light that is propagated through the optical path of the optical fiber array 18. The actuators 42 are arranged so as to move the shutter members 40 vertically.

Figure 5:
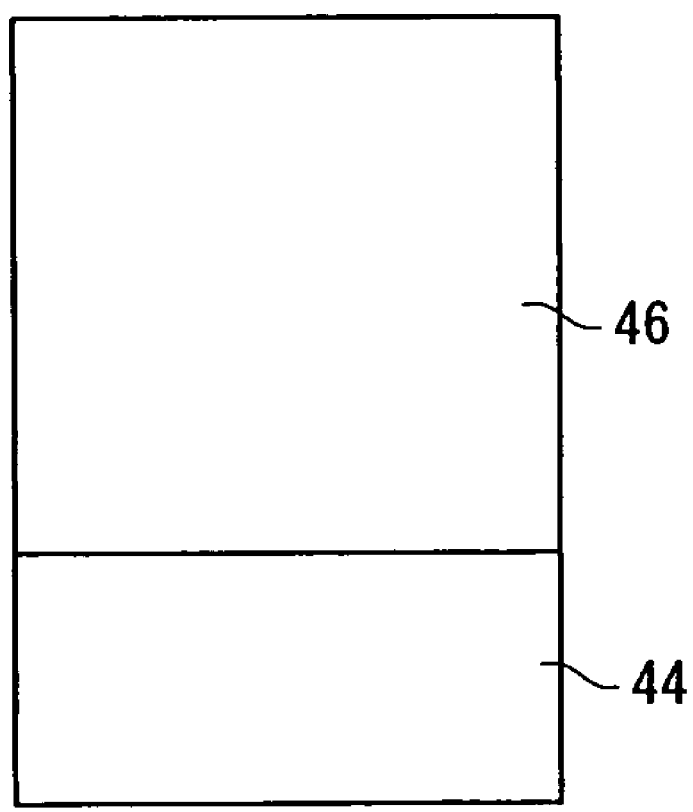
FIG. 5 is a front elevational view of a shutter member.

The shutter members 40 are fixed to ends of the actuators 42, and are positioned in substantial alignment with the tilted slit 26. As shown in FIG. 5, each of the shutter members 40 has a base made of transparent quartz glass 44 and a light reflecting film 46 disposed on a portion of a surface of the quartz glass 44 (i.e., a surface facing the optical axis of the light exit portion 16A).

A wiring board 48 is disposed above the optical fiber array 18 with a first spacer 50 and a second spacer 52 interposed therebetween. The second spacer 52 comprises an upper spacer 52A and a lower spacer 52B, which are integrally combined with each other by an adhesive, for example. The actuators 42 have respective other ends fixed between the upper spacer 52A and the lower spacer 52B, so that the actuators 42 are fixedly supported in a cantilevered fashion.

Figure 6:
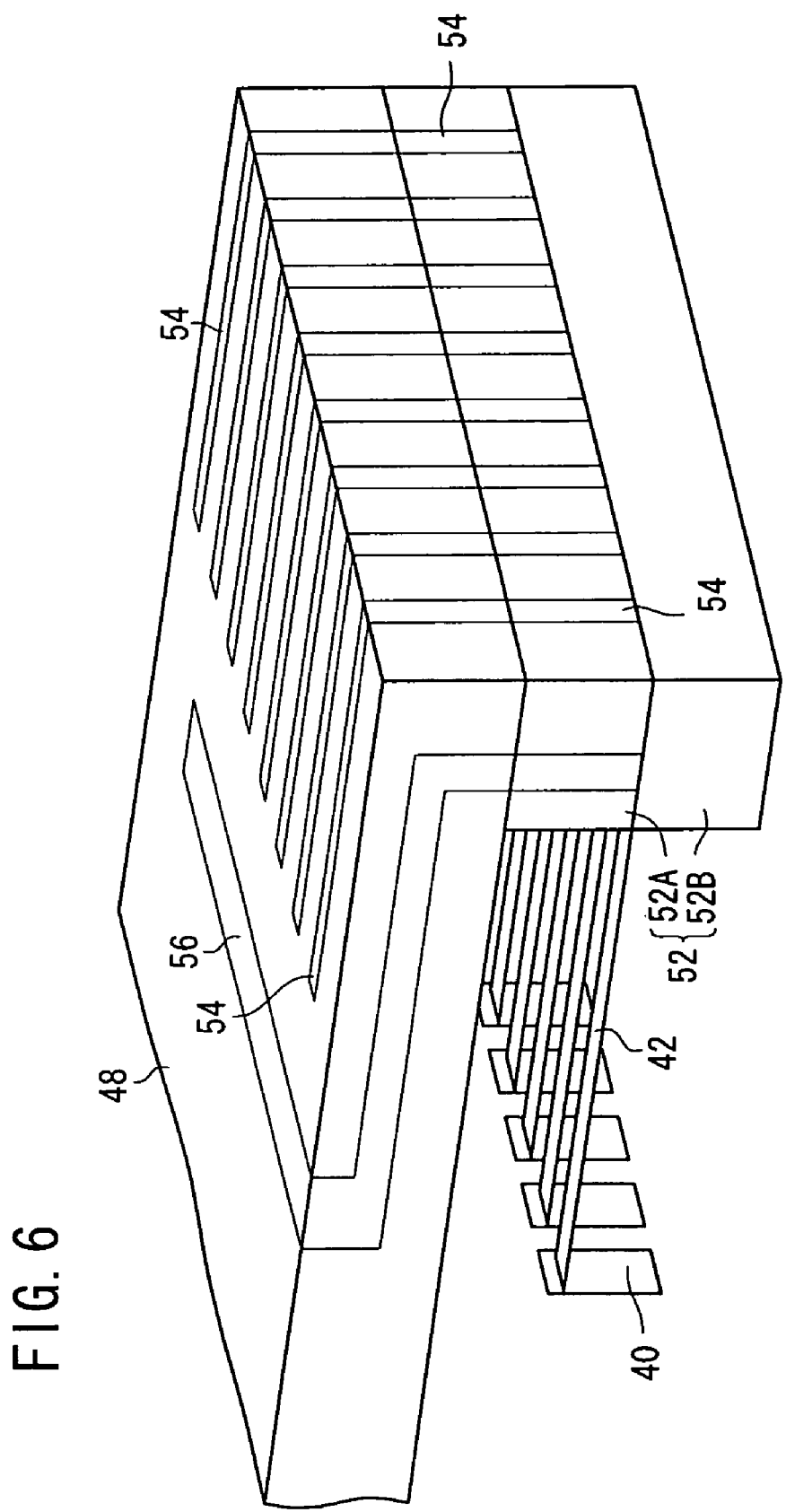
FIG. 6 is a perspective view, partly omitted from illustration, of electrode patterns disposed on a second spacer and a wiring board.

As shown in FIG. 6, electrode patterns 54, which are separately associated with each of the respective channels, extend from a rear surface of the upper spacer 52A to an upper surface of the wiring board 48. An electrode pattern (common electrode pattern) 56, which is shared by the channels, extends from a side surface of the upper spacer 52A to a side surface of the wiring board 48 and an upper surface of the wiring board 48.

Figure 7:
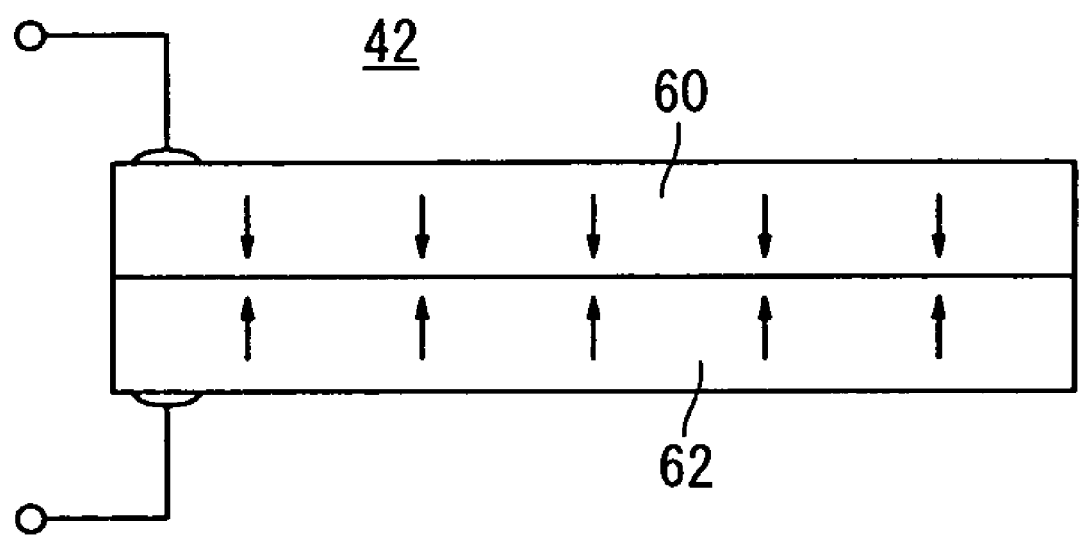
FIG. 7 is a view showing a series-type actuator.
Figure 8:
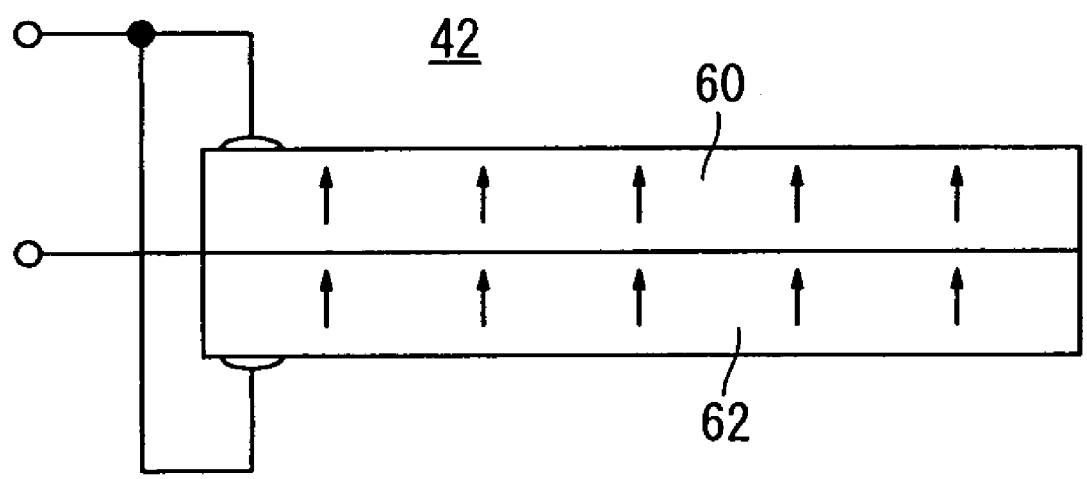
FIG. 8 is a view showing a parallel-type actuator.

As shown in FIGS. 7 and 8, each of the actuators 42 has a series-type bimorph structure, or a parallel-type bimorph structure, comprising two plate-like piezoelectric devices 60, 62 that are polarized transversely and bonded to each other, with electrodes (not shown) embedded therein.

If the series-type bimorph structure shown in FIG. 7 is employed, then the electrodes may be disposed in upper and lower portions thereof. If the parallel-type bimorph structure shown in FIG. 8 is employed, then the electrodes may be disposed in central, upper, and lower portions of the actuator, wherein the upper and lower electrodes are kept at the same potential and a voltage is applied between those electrodes and the central electrode. As shown in FIG. 7, the series type structure is characterized in that the direction of polarization is reversed at the center in the transverse direction of the actuator 42, with the electrodes being disposed only in the upper and lower portions thereof. As shown in FIG. 8, the parallel type structure is characterized in that the two piezoelectric devices 60, 62, which are polarized in the same direction, are bonded to each other with the central electrode interposed therebetween, for producing a displacement that is twice the displacement produced by the series type structure.

Among the electrodes embedded within the actuators 42, the electrode shared by the channels extends to the side surface of the upper spacer 52A and is electrically connected to the common electrode pattern 56, and the separate electrodes corresponding to the respective channels extend to the rear surface of the upper spacer 52A and are electrically connected to the corresponding electrode patterns 54.

As shown in FIG. 3, the slit 26 is filled with an adhesive 64 having a low viscosity, which functions as a compensating refractive index matching agent, in order to prevent signal light from being sharply attenuated in the slit 26, and also for allowing the shutter member 40 to move smoothly within the slit 26.

The slit 26 has a width W set to a distance large enough to prevent the shutter member 40 from impinging upon the end face of the light exit portion 16A and the end face of the light entrance portion 16B when the shutter member 40 moves. In this embodiment, the width W is set to 30 µm or greater and 200 µm or smaller.

When no drive voltage is applied to the actuator 42, the actuator 42 remains in a state (initial state) substantially parallel to the optical axis of the optical fiber array 18. At this time, the optical axis of the light exit portion 16A faces the lower portion of the shutter member 40 (the transparent quartz glass 44). Signal light that is emitted from the optical axis of the light exit portion 16A passes through the adhesive 64 in the slit 26, the quartz glass 44 of the shutter member 40, and the adhesive 64, and enters the light entrance portion 16B, after which the signal light is propagated downstream.

When a drive voltage is applied to the actuator 42, the upper piezoelectric device 60 is expanded due to the piezoelectric transversal effect, and the lower piezoelectric device 62 is contracted, with the result that the actuator 42 is bent downwardly as a whole. At this time, the optical axis of the light exit portion 16A faces the upper portion of the shutter member 40 (the light reflecting film 46), so that signal light emitted from the optical axis of the light exit portion 16A is blocked by the light reflecting film 46.

When application of voltage to the actuator 42 is subsequently stopped, the piezoelectric devices 60, 62 return to their original shape, and the actuator 42 returns to its initial state, as described above.

As described above, the optical devices 10A, 10B according to the first and second embodiments, which have the light control means 28A according to the first specific example, do not require a plurality of optical lenses, and therefore can advantageously be reduced in size and cost. Furthermore, since the slit 26 is filled with an adhesive having a low viscosity and functioning as a refractive index matching agent, the optical devices can block and transmit signal light without impairing characteristics of the signal light.

Furthermore, the light control means 28A is constructed such that the shutter member 40 is moved by the actuator 42. Inasmuch as the shutter member 40 is actuated when the material itself of the piezoelectric devices 60, 62 is expanded and contracted, the long-term reliability of the actuated member is not impaired.

A light control means 28B according to a second specific example shall be described below with reference to FIGS. 9 through 11.

As shown in FIG. 9, the light control means 28B according to the second specific example has essentially the same structure as the light control means 28A according to the first specific example, but differs therefrom in that the actuators 42 elastically deform the light exit portions 16A or the light entrance portions 16B of the optical fibers 16 in order to displace the optical axis. In FIG. 9, the light entrance portion 16B is elastically deformed.

Figure 11:
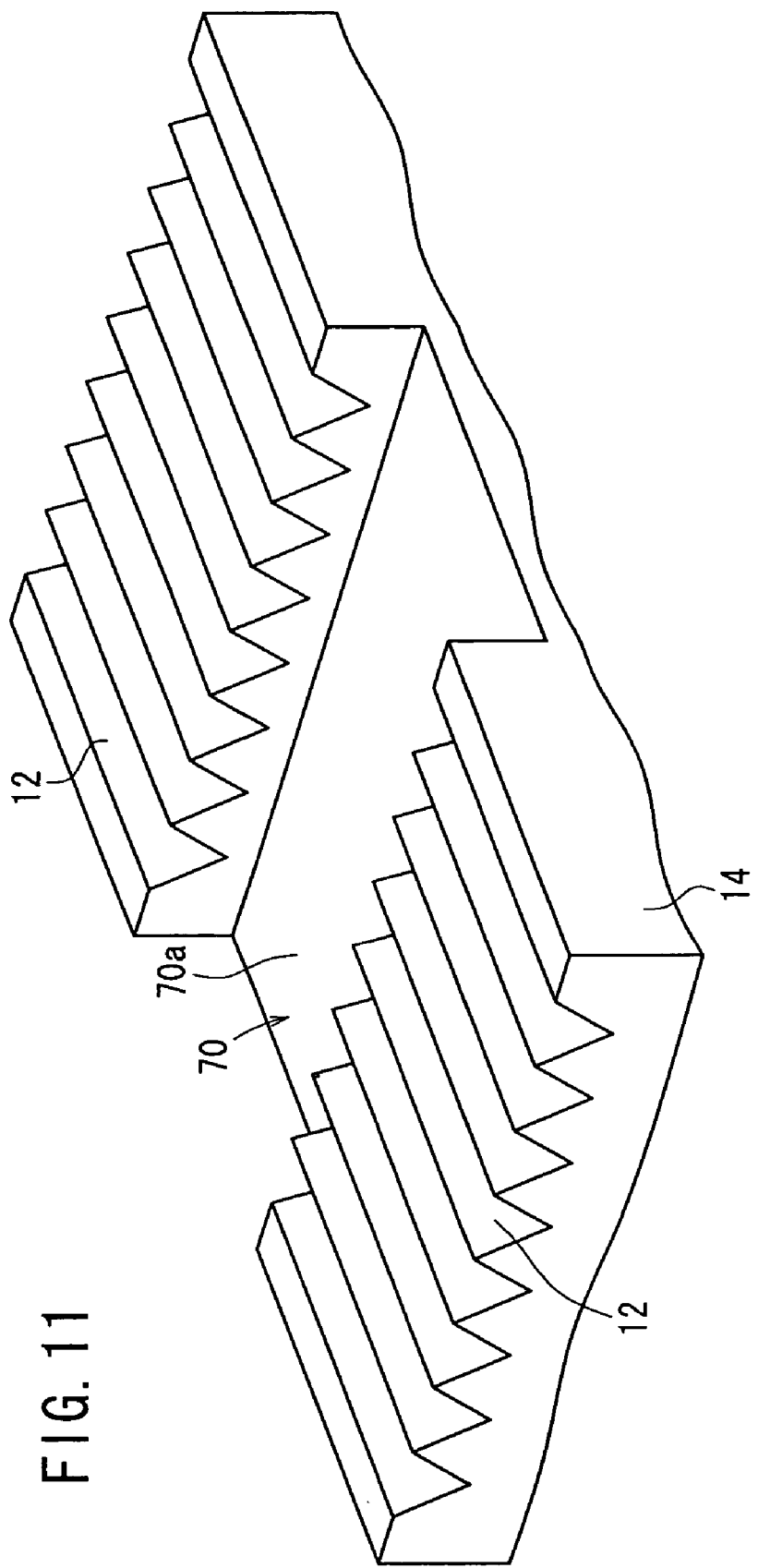
FIG. 11 is a perspective view, partly omitted from illustration, of a glass substrate with a recess defined therein.
Figure 12:
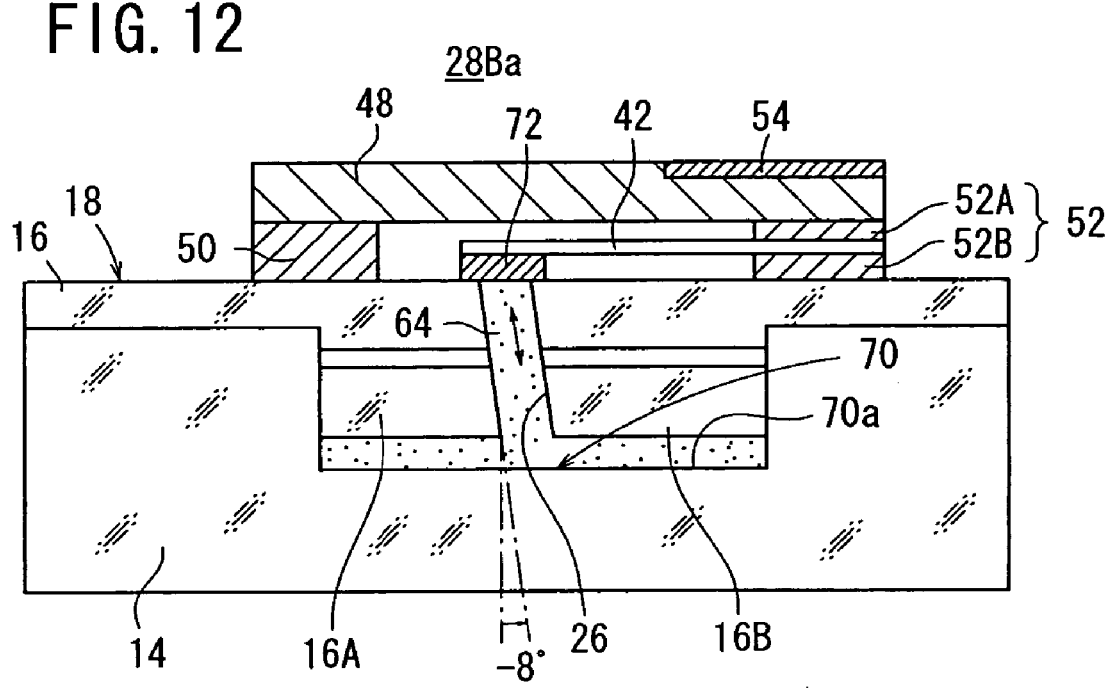
FIG. 12 is a cross-sectional view showing a modification of the light control means according to the second specific example.

The glass substrate 14 has a recess 70 defined in a portion thereof where the slit 26 of the optical fiber array 18 is positioned (see FIG. 11). The recess 70 has a bottom 70a positioned downwardly of the lower surface of the optical fiber array 18. The recess 70 and the slit 26 are filled with an adhesive 64 having a low viscosity, which functions as a refractive index matching agent.

Each of the actuators 42 has a tip end portion, which may be fixed to the upper surface of the light entrance portion 16B by an adhesive (not shown). In this case, when the actuator 42 is restored to an initial position, the light entrance portion 16B also easily returns to its original position in unison with the actuator 42. If the optical fiber 16 tends to have its optical axis easily shifted due to a difference between the coefficients of thermal expansion of the optical fiber 16 and the actuator 42, then the actuator 42 may not be fixed to the light entrance portion 16B by an adhesive. In this case, a resin-made holding member 72, for example, which is held in contact with the upper surface of the light entrance portion 16B, may be fixed to the lower surface of the tip end portion of the actuator 42.

When no drive voltage is applied to the actuator 42, the actuator 42 remains in a state (initial state) substantially parallel to the optical axis of the optical fiber array 18. At this time, signal light that is emitted from the optical axis of the light exit portion 16A passes through the adhesive 64 in the slit 26 and enters the light entrance portion 16B, after which the signal light is propagated downstream.

When a drive voltage is applied to the actuator 42, the actuator 42 is bent downwardly as a whole. The light entrance portion 16B is pressed and displaced downwardly. As a result, the optical axis of the light exit portion 16A and the optical axis of the light entrance portion 16B are brought out of alignment with each other, so that signal light emitted from the optical axis of the light exit portion 16A is blocked.

When application of voltage to the actuator 42 is subsequently stopped, the piezoelectric devices 60, 62 return to their original shape, and the actuator 42 returns to its initial state as described above. At this time, the light entrance portion 16B also elastically returns to its original position, bringing the optical axis of the light exit portion 16A and the optical axis of the light entrance portion 16B into alignment with each other.

As described above, the optical devices 10A, 10B according to the first and second embodiments, which have the light control means 28B according to the second specific example, do not require a plurality of optical lenses, and thus can advantageously be reduced in size and cost. Furthermore, since the actuator 42 is actuated when the material itself of the piezoelectric devices 60, 62 is expanded and contracted, long-term reliability of the actuated member is not impaired.

Particularly, inasmuch as the shutter member 40 does not need to be inserted into the slit 26, the width of the slit 26 may be reduced, so that the characteristics of the signal light are not impaired.

Since the glass substrate 14 has a recess 70 therein, the light entrance portion 16B can easily be displaced downwardly by the actuator 42. Even though the glass substrate 14 is provided in order to facilitate arrangement of the optical fiber array 18, the light exit portions 16A and the light entrance portions 16B of the optical fibers 16 can easily be elastically deformed by the piezoelectric devices 60, 62.

Figure 10:
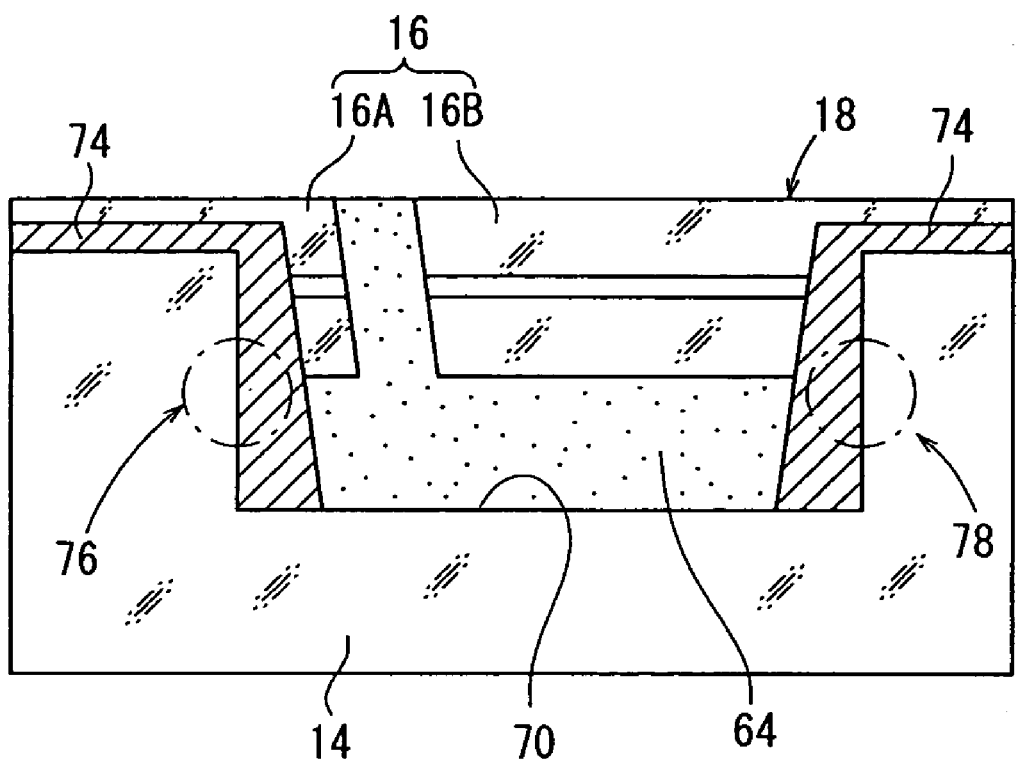
FIG. 10 is a cross-sectional view showing a portion of another example of the light control means according to the second specific example.

For securing the optical fiber array 18 in the V-grooves 12, the optical fiber array 18 is normally coated with an adhesive (fixing adhesive) 74, thereby securing the optical fibers 16 as shown in FIG. 10. The fixing adhesive 74 is made of a material that is more viscous than the adhesive 64 which fills the slit 26. The fixing adhesive 74, which is present in a boundary region 76 between the recess 70 and the light exit portion 16A and in a boundary region 78 between the recess 70 and the light entrance portion 16B, offers the following advantages.

When the light entrance portion 16B is elastically deformed as described above, stress concentration occurs under a bending load at the pivot (i.e., boundary regions 76, 78) of the light entrance portion 16B. Such stress concentration is liable to cause disconnections during continuous operation over a prolonged period of time. However, the fixing adhesive 74, which is present in the boundary regions 76 and 78, functions as a cushioning member at the pivot (i.e., boundary regions 76, 78) for reducing stress concentration, thereby increasing the lifetime of the optical devices 10A, 10B.

In the example shown in FIG. 9, the light entrance portion 16B is elastically deformed. However, the light exit portion 16A may also be elastically deformed. Alternatively, both the light exit portion 16A and the light entrance portion 16B may be elastically deformed in a light control means 28Ba, according to a modification shown in FIG. 12. Elastic deformation of both the light exit portion 16A and the light entrance portion 16B can be achieved when the actuator 42 simultaneously presses the light exit portion 16A and the light entrance portion 16B. According to this modification, the optical path of the signal light can be shut off with a small displacement (i.e., a small drive force).

With the light control means 28A, 28B according to the first and second specific examples, signal light is primarily transmitted or blocked. However, the light control means 28A, 28B may be used to transmit or variably attenuate the signal light.

In the light control means. 28A according to the first specific example, for instance, an ND filter whose shading varies continuously from an upper end to a lower end thereof may be used in place of the light reflecting film 46 of the shutter member 40. The distance that the shutter member 40 is vertically displaced varies depending on an attribute (voltage level, current level, pulse duration, etc.) of an electric signal supplied to the actuator 42, thereby variably attenuating the signal light.

In the light control means 28B according to the second specific example, the optical axis of the light entrance portion 16B is vertically moved depending on the electric signal attribute supplied to the actuator 42, thereby variably attenuating the signal light.

A light control means 28C according to a third specific example shall be described below with reference to FIGS. 13 through 20.

Figure 13:
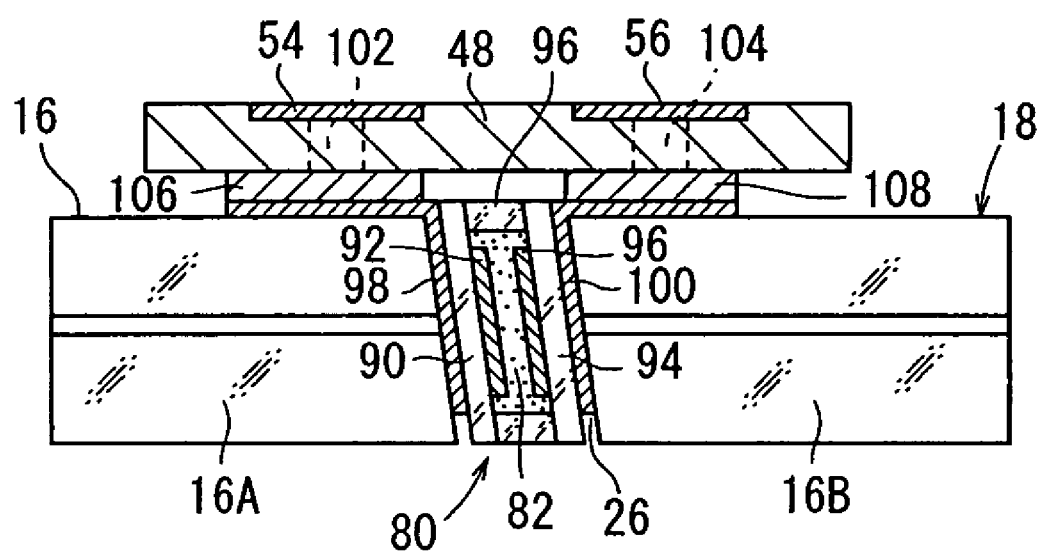
FIG. 13 is a cross-sectional view showing a light control means according to a third specific example.

As shown in FIG. 13, the light control means 28C according to the third specific example has essentially the same structure as the light control means 28A according to the first specific example, but differs therefrom in that a liquid crystal device 80, whose transparency changes depending on an electric signal applied thereto, is inserted in the slit 26.

The liquid crystal device 80 is a polymer-dispersed liquid crystal device, which as shown in FIG. 13 comprises a liquid crystal layer 82 surrounded by a front panel 84, a rear panel 86, and side panels 88. The front panel 84 has a glass plate 90 and transparent electrodes 92 disposed on one surface (a surface facing the liquid crystal layer 82) of the glass plate 90. The rear panel 86 has a glass plate 94 and a transparent electrode 96 disposed on one surface (a surface facing the liquid crystal layer 82) of the glass plate 94. The transparent electrodes 92 are separately associated with each of the respective channels. The transparent electrode 96 is shared by all channels.

Figure 14:
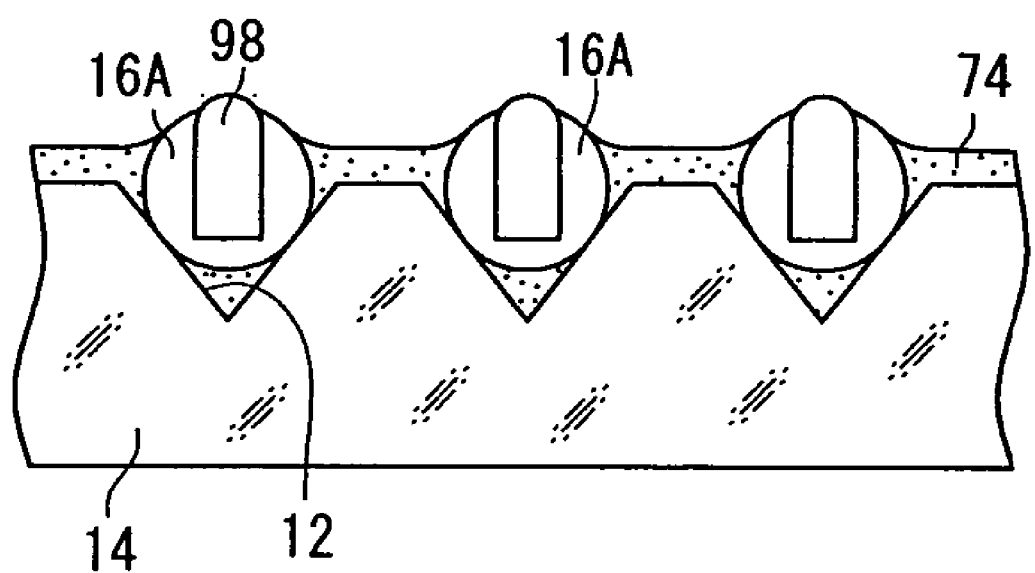
FIG. 14 is a view showing transparent electrodes disposed on an end face of a light emitter.
Figure 15:
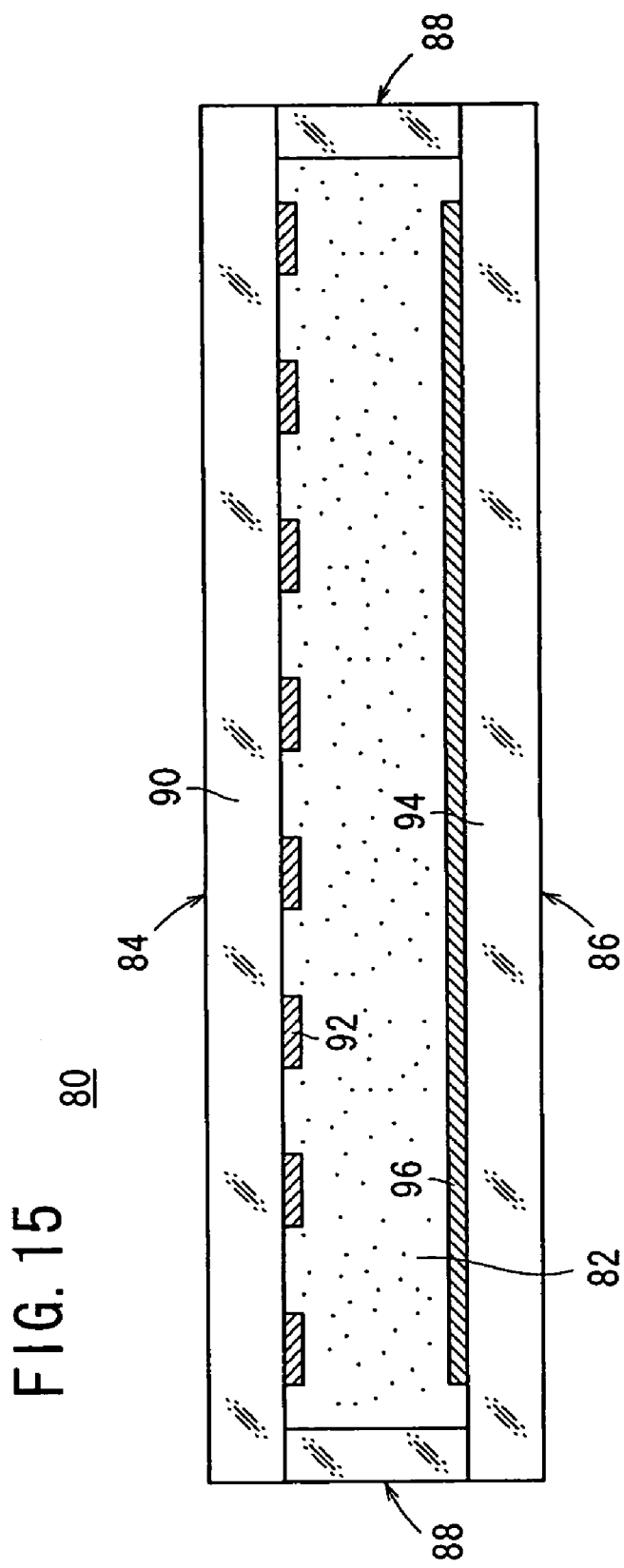
FIG. 15 is a cross-sectional view showing a liquid crystal device inserted in a slit.

As shown in FIGS. 13 and 14, transparent electrodes 98 extend from the end faces of the light exit portions 16A of the respective optical fibers 16 to the upper surfaces thereof, and transparent electrodes 100 extend from the end faces of the light entrance portions 16B of the respective optical fibers 16 to the upper surfaces thereof.

Therefore, when the liquid crystal device 80 is inserted in the slit 26 of the optical fiber array 18, the transparent electrodes 98 on the end faces of the light exit portions 16A and the transparent electrodes 92 of the liquid crystal device 80 face each other through the glass plate 90, thereby providing an array of coupling capacitors corresponding to the respective channels. The transparent electrodes 100 on the end faces of the light entrance portions 16B and the transparent electrode 96 of the liquid crystal device 80 face each other through the glass plate 94, thus providing a single coupling capacitor shared by the channels.

A wiring board 48 is disposed above the optical fiber array 18. Electrode patterns 54, which are separately associated with each of the respective channels, and an electrode pattern (common electrode pattern) 56, which is shared by all channels, are disposed on the upper surface of the wiring board 48. The wiring board 48 has through holes 102, 104 defined therein at positions corresponding to the electrode patterns 54 and the common electrode pattern 56.

Electrically conductive layers 106 such as electrically conductive paste layers, solder bumps, or the like are interposed between the transparent electrodes 98 on the upper surfaces of the light exit portions 16A and the through holes 102 in the wiring board 48. The transparent electrodes 98 of the respective channels and the corresponding electrode patterns 54 are electrically connected by the electrically conductive layers 106 and the through holes 102.

Similarly, electrically conductive layers 108 such as electrically conductive paste layers, solder bumps, or the like are interposed between the transparent electrodes 100 on the upper surfaces of the light entrance portions 16B and the through holes 104 in the wiring board 48. The transparent electrodes 100 and the common electrode pattern 56 are electrically connected by the electrically conductive layers 108 and the through holes 104.

When electric signals are supplied through the electrode patterns 54 and the common electrode pattern 56 on the wiring board 48, the electric signals are supplied to the transparent electrodes 92, 96 of the liquid crystal device 80 through the respective coupling capacitors.

In the optical devices 10A, 10B according to the first and second embodiments, which have the light control means 28C according to the third specific example, the transparency of the liquid crystal device 80 changes depending on the attribute (voltage level, current level, pulse duration, etc.) of electric signals supplied through the electrode patterns 54 and the common electrode pattern 56 on the wiring board 48, thus making it possible to realize highly accurate variable light attenuation. The optical devices 10A, 10B can also easily control the transmission and blocking of light, thereby functioning as high-performance optical switches.

Moreover, because the liquid crystal device 80 is disposed in the slit 26, the optical device is small in size and low in cost. Since mechanically actuated members are not used, the optical device has long-term reliability.

In particular, since the transparent electrodes 98 that are electrically connected to the respective electrode patterns 54 extend from the upper surface of the light exit portion 16A to the end face thereof facing the slit 26, and since the transparent electrodes 100 that are electrically connected to the common electrode pattern 56 extend from the upper surface of the light entrance portion 16B to the end face thereof facing the slit 26, it is easy to supply electric signals from an external source to the liquid crystal device 80 disposed in the slit 26.

Furthermore, since the wiring board 48 is disposed above the slit 26 of the optical fiber array 18 and through holes 102, 104 are defined in the wiring board 48, electric signals can easily be supplied to the liquid crystal device 80 through the electrode patterns 54 and the common electrode pattern 56 on the upper surface of the wiring board 48. Because the wiring board 48 is mounted on the liquid crystal device 80, the wiring paths extending from the liquid crystal device 80 to the electrode patterns 54 and the common electrode pattern 56 are reduced in length, thus reducing the introduction of high-frequency noise.

Figure 16:
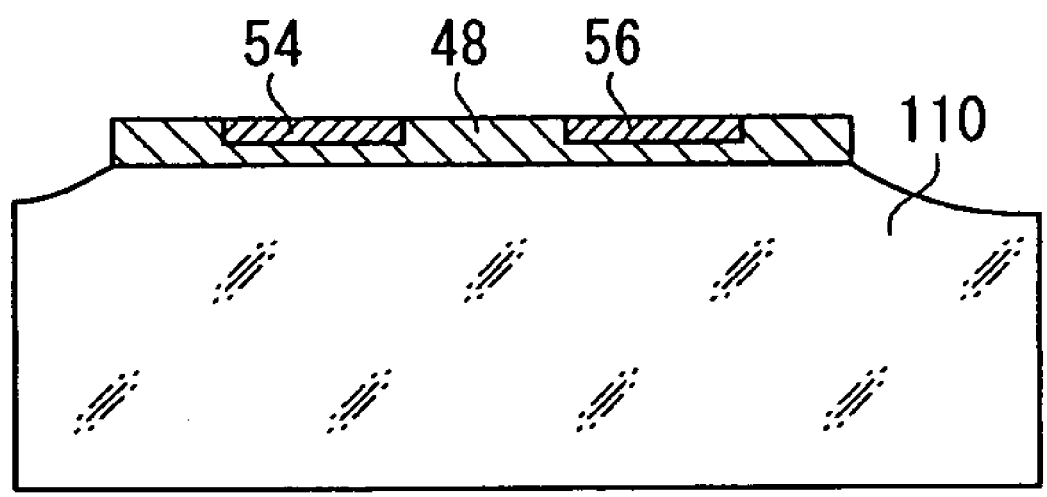
FIG. 16 is a view showing a resin-encased structure in the light control means according to the third specific example.

As shown in FIG. 16, the optical device may have a resin layer 110 (a resin-encased structure) disposed in covering relation to a region of the optical device where the liquid crystal device 80 is inserted, and in covering relation to a region of the optical device where the electrically conductive layers 106, 108 are included. The resin layer 110 is effective to avoid electromagnetic interference with surrounding circuits and to reduce the introduction of noise, while also making the optical device highly resistant to humidity.

Figure 17:
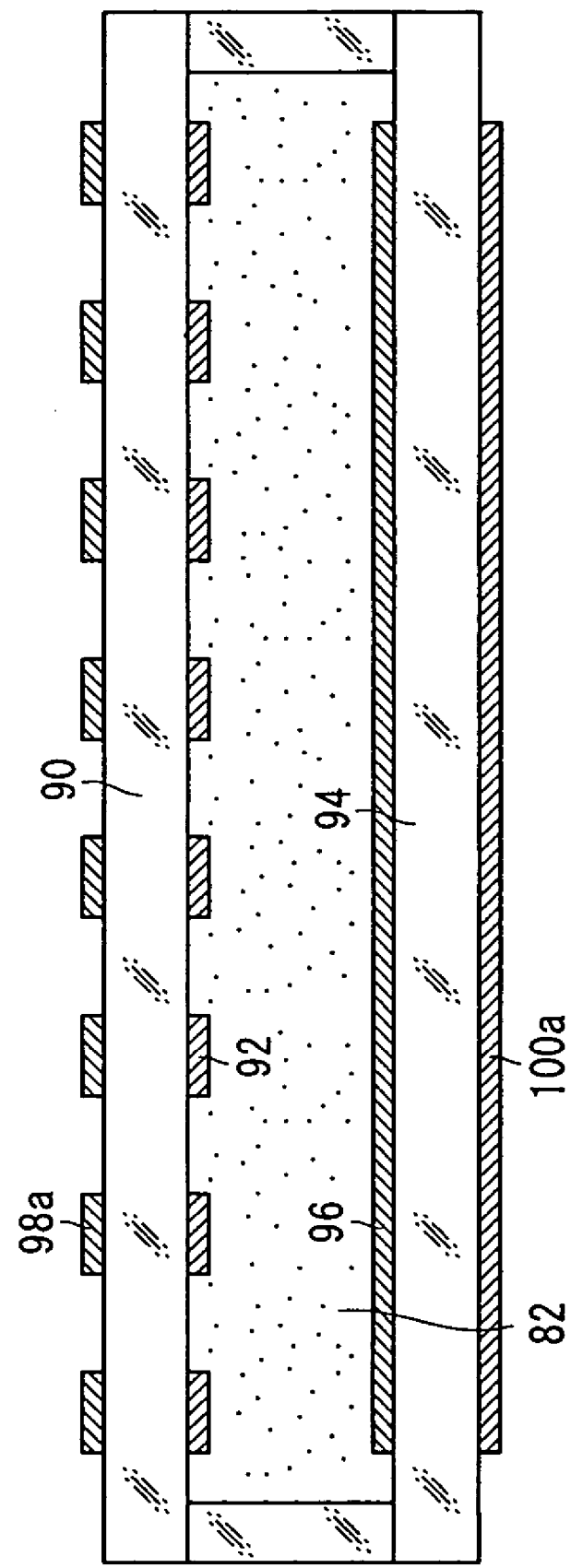
FIG. 17 is a cross-sectional view showing transparent electrodes disposed on outer surfaces of a glass panel of the liquid crystal device.
Figure 18:
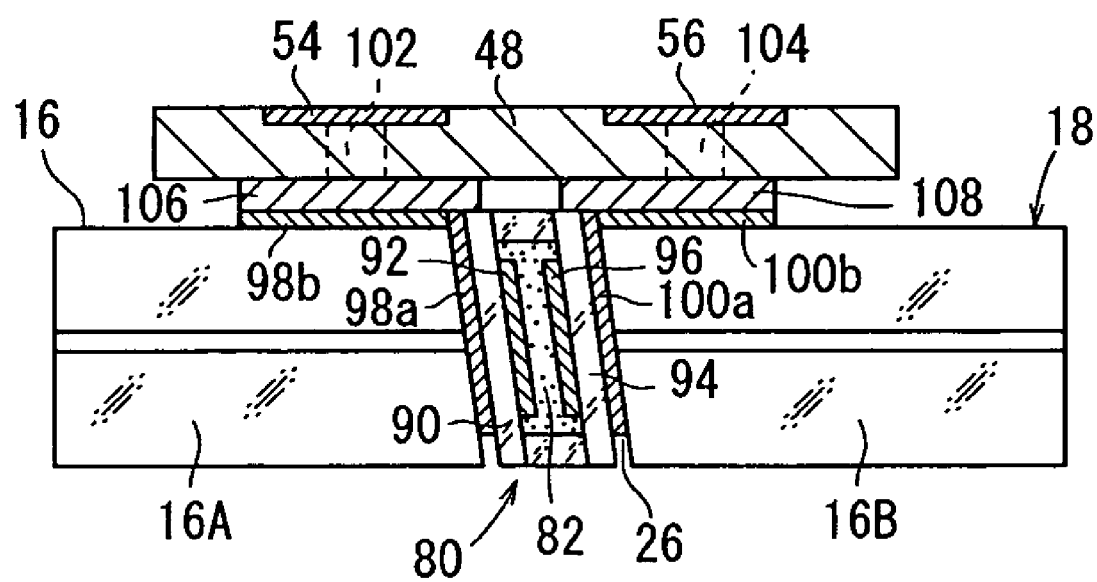
FIG. 18 is a cross-sectional view showing another structure by which electrodes of the liquid crystal device are connected.

The electrodes of the liquid crystal device 80 may be connected by a different structure, other than the structure described above. For example, as shown in FIGS. 17 and 18, transparent electrodes 98a are disposed on the other surface (i.e., the surface facing the end face of the light exit portion 16A) of the glass plate 90 of the liquid crystal device 80, rather than on the end face of the light exit portion 16A. A transparent electrode 10a is disposed on the other surface (i.e., the surface facing the end face of the light entrance portion 16B) of the glass plate 94, rather than on the end face of the light entrance portion 16B.

The transparent electrodes 98a on the glass plate 90 of the liquid crystal device 80 and the transparent electrodes 98b on the upper surface of the light exit portion 16A are electrically connected to each other by electrically conductive layers 106. The transparent electrode 100a on the glass plate 94 of the liquid crystal device 80 and the transparent electrodes 100b on the upper surface of the light entrance portion 16B are electrically connected to each other by electrically conductive layers.

The above structure is advantageous for use in a polymer-dispersed liquid crystal device 80, which requires no polarizer, and is effective in situations where it is difficult to form transparent electrodes 98, 100 on the end faces of the slit 26 (i.e., the end faces of the light exit portions 16A and the end faces of the light entrance portions 16B).

Figure 19:
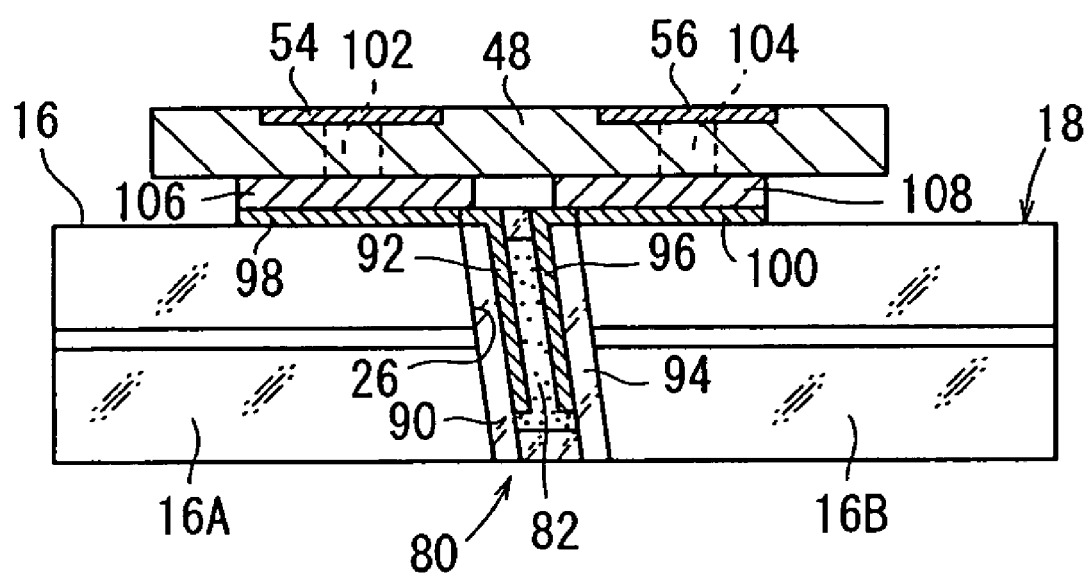
FIG. 19 is a cross-sectional view showing still another structure by which electrodes of the liquid crystal device are connected.

The electrodes of the liquid crystal device 80 may be connected using still another structure, other than the structure described above. As shown in FIG. 19, transparent electrodes 92 of the liquid crystal device 80 are formed by printing, for example, and extend outwardly on the end face of the glass plate 90. Similarly, transparent electrodes 96 are formed by printing, for example, and extend outwardly on the end face of the glass plate 94. The transparent electrodes 98 on the upper surfaces of the light exit portions 16A and the transparent electrodes 92 extending on the end face of the glass plate 90 are electrically connected to each other by electrically conductive layers 106. The transparent electrodes 100 on the upper surfaces of the light entrance portions 16B and the transparent electrodes 96 extending on the end face of the glass plate 94 are electrically connected to each other by electrically conductive layers 108.

With this structure, transparent electrodes are not required to be formed on the end faces of the light exit portions 16A and on the end faces of the light entrance portions 16B, making the optical device more cost-effective.

Figure 20:
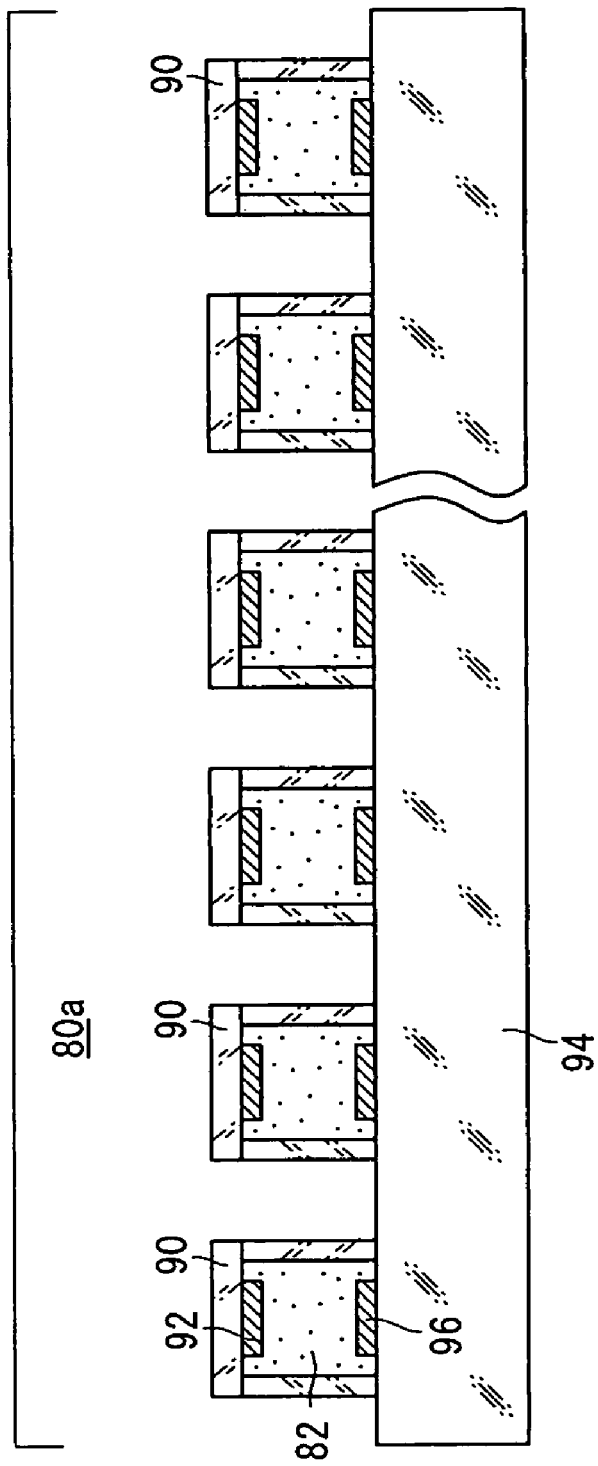
FIG. 20 is a cross-sectional view showing another example of the liquid crystal device.

The liquid crystal device 80 described above has one cell, forming eight channels, and has separate transparent electrodes 92 associated with the respective channels. However, as shown in FIG. 20, a liquid crystal device 80a having separate cells associated with each of the respective channels may also be employed. The liquid crystal device 80a has a single common glass plate 94 and separate glass plates 90 associated with the respective channels, thereby providing respective cells. This structure is advantageous in that a given channel is not susceptible to orientation of the liquid crystals of adjacent channels, freeing the optical device of crosstalk concerns.

An optical device 10C according to a third embodiment shall be described below with reference to FIG. 21.

Figure 21:
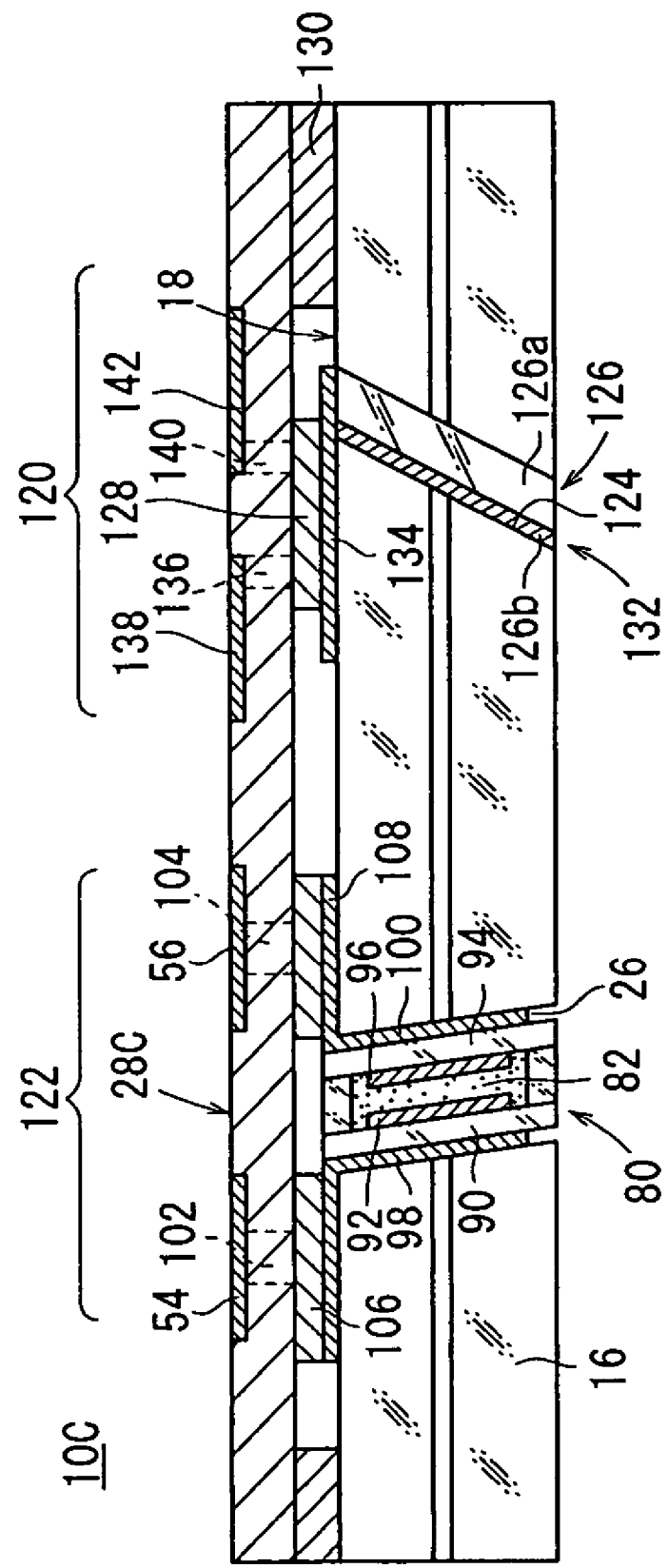
FIG. 21 is a view showing a portion of an optical device according to a third embodiment.

As shown in FIG. 21, the optical device 10C according to the third embodiment mainly includes a monitor 120 for detecting branched light from the signal light that is propagated through the optical path of an optical fiber array 18, and for converting the detected branched light into electric signals depending on the intensity of the branched light. The optical device 10C further includes a light controller 122 for controlling signal light, which is propagated through the optical path of the optical fiber array 18, based on an electric signal from the monitor 120. In particular, a single wiring board 48 (which is the same as the wiring board 48 shown in FIG. 13) extends from the light controller 122 to the monitor 120.

The light controller 122 includes the light control means 28C according to the first specific example described above. Parts thereof, which correspond to parts shown in FIG. 13, are denoted by identical reference characters and shall not be described in detail below.

The monitor 120 has a second slit 124 extending from upper surfaces of each of the optical fibers 16 toward the glass substrate (not shown), a branching member 126 (having a multilayer film 126b on a quartz base 126a) inserted in the second slit 124, a PD (PhotoDiode) array 128 for detecting light (branched light) branched from signal light transmitted through each of the optical fibers 16 by at least the branching member 126, and a wiring board 48 having the PD array 128 mounted thereon and securing the PD array 128 so as to face the optical fiber array 18. Spacers 130 are interposed between the optical fiber array 18 and the wiring board 48, wherein the spacers 130 are positioned to keep the wiring board 48 substantially parallel to the optical axis of the optical fiber array 18. Two end faces of the second slit 124 and front and back surfaces of the branching member 126 function as a branching unit 132 for branching a portion of the signal light that is transmitted through the optical fibers 16.

An adhesive 134, which functions as a refractive index matching agent, is interposed between the optical fiber array 18 and the PD array 128. The PD array 128 has anode electrodes electrically connected to electrode patterns 138 disposed on the upper surface of the wiring board 48 via through holes 136 in the wiring board 48, and cathode electrodes electrically connected to electrode patterns 142 disposed on the upper surface of the wiring board 48 via through holes 140 in the wiring board 48.

The optical device 10C according to the third embodiment is constructed as an optical device, wherein the monitor 120 for monitoring signal light and the light controller 122 for controlling signal light are integrally combined with each other. The optical device 10C provides multiple functions, while being both small in size and low in cost.

Particularly, since the single wiring board 48 extends from the light controller 122 to the monitor 120, the optical device 10C, which includes the monitor 120 and the light controller 122 integrally combined with each other, is further reduced in size. The portion of the optical fiber array 18, which is present between the slit 26 of the light controller 122 and the second slit 124 of the monitor 120, is positioned and held in place by the wiring board 48, so that the portion is prevented from being positionally displaced.

In the optical device 10C according to the third embodiment, the electrodes of the monitor 120 and the electrodes of the light controller 122 are connected using a single wiring board 48. However, the electrodes may also be connected separately, e.g., using separate wiring boards.

In the optical device 10C according to the third embodiment, the light control means 28C according to the third specific example is employed as the light controller 122. However, the light control means 28A according to the first specific example, or the light control means 28B according to the second specific example, may also be employed as the light controller 122.

Various modifications of the monitor 120 shall be described below with reference to FIGS. 22A through 24.

Figure 22A:
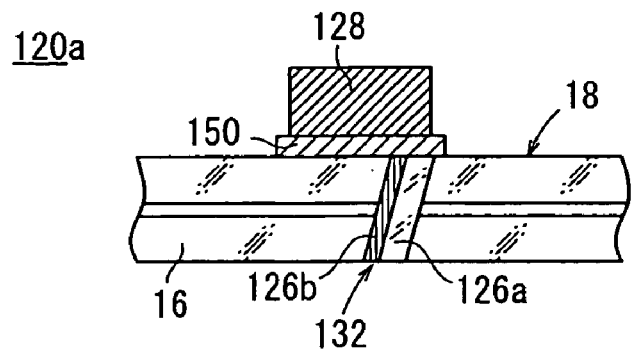
FIG. 22A is a cross-sectional view showing a portion of a monitor according to a first modification.

As shown in FIG. 22A, a monitor 120a according to a first modification differs in that a polarizer 150 is disposed over the optical path of branched light on the upper surface of each optical fiber 16. Light that has passed through the polarizer 150 is detected by the PD array 128. Since only a certain polarized component of the branched light passes through the polarizer 150, the monitor 120a can be used in various detecting processes using the branched light.

Figure 22B:
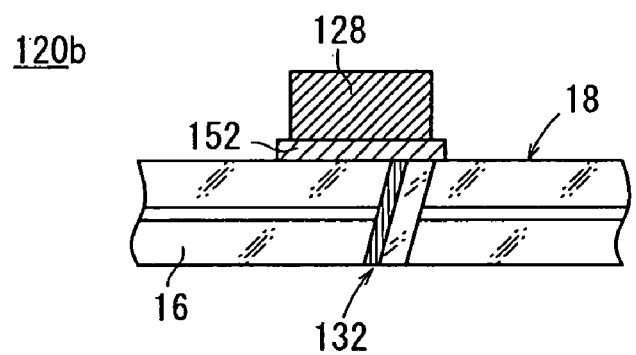
FIG. 22B is a cross-sectional view showing a portion of a monitor according to a second modification.

As shown in FIG. 22B, a monitor 120b according to a second modification differs in that a wavelength filter 152 is disposed over the optical path of branched light on the upper surface of each optical fiber 16. The monitor 120b is capable of detecting only a certain wavelength of the branched light.

Figure 22C:
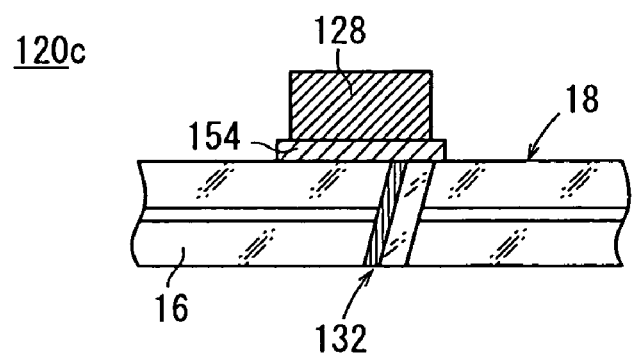
FIG. 22C is a cross-sectional view showing a portion of a monitor according to a third modification.

As shown in FIG. 22C, a monitor 120c according to a third modification differs in that a variable-wavelength filter 154 is disposed over the optical path of branched light on the upper surface of each optical fiber 16. The monitor 120c can serve as a variable-wavelength monitor, and is capable of detecting each of various wavelengths of the branched light.

Figure 23A:
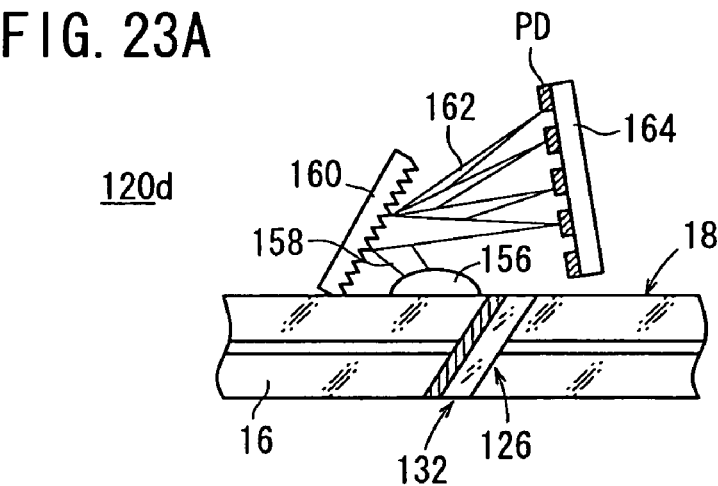
FIG. 23A is a cross-sectional view showing a portion of a monitor according to a fourth modification.

As shown in FIG. 23A, a monitor 120d according to a fourth modification differs in that a lens 156 is disposed over the optical path of branched light on the upper surface of each optical fiber 16. The lens 156 allows the branched light to be radiated into space. Further, according to the fourth modification, a tilted reflective diffraction grating 160 is disposed in the optical path of light 158 that is emitted from the lens 156. Since the diffraction angle of diffracted light 162 from the reflective diffraction grating 160 differs depending on wavelength, a PD array 164 comprising an array of PDs and positioned where the diffracted light 162 arrives is capable of detecting branched light depending on the wavelength thereof.

Figure 23B:
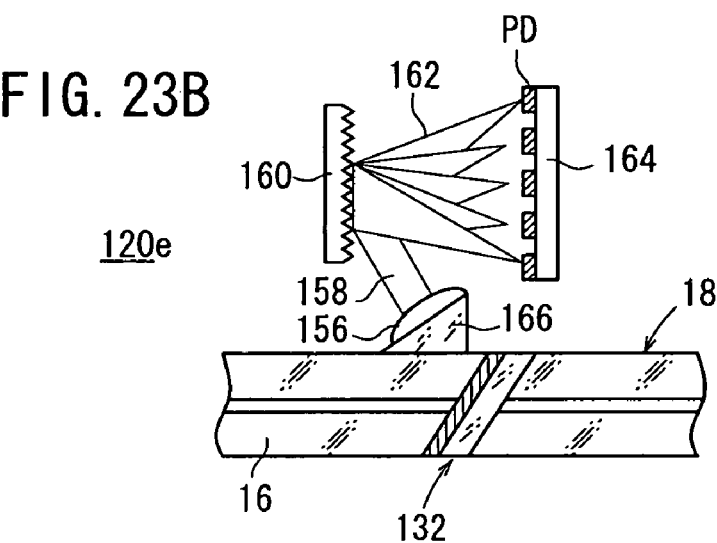
FIG. 23B is a cross-sectional view showing a portion of a monitor according to a fifth modification.

As shown in FIG. 23B, a monitor 120e according to a fifth modification differs in that a prism 166 is disposed over the optical path of branched light on the upper surface of each optical fiber 16, with a lens 156 disposed on a slanted surface of the prism 166. Further, a reflective diffraction grating 160 is disposed vertically, for example, in the optical path of light 158 emitted from the lens 156. A PD array 164 comprising an array of PDs and positioned where the diffracted light 162 arrives is capable of detecting branched light depending on the wavelength thereof.

Figure 23C:
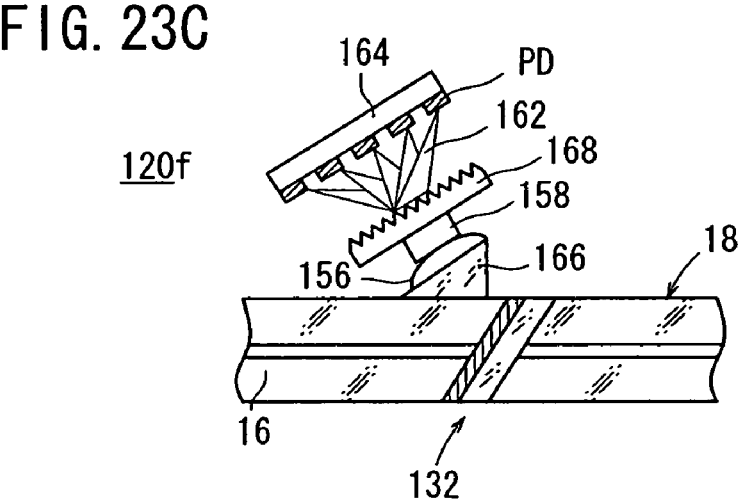
FIG. 23C is a cross-sectional view showing a portion of a monitor according to a sixth modification.

As shown in FIG. 23C, a monitor 120f according to a sixth modification differs in that a prism 166 is disposed over the optical path of branched light on the upper surface of each optical fiber 16, with a lens 156 disposed on a slanted surface of the prism 166, and wherein a transmissive diffraction grating 168 is disposed in the optical path of light 158 emitted from the lens 156. A PD array 164 comprising an array of PDs and positioned where the diffracted light 162 arrives is capable of detecting branched light depending on the wavelength thereof.

Figure 24:
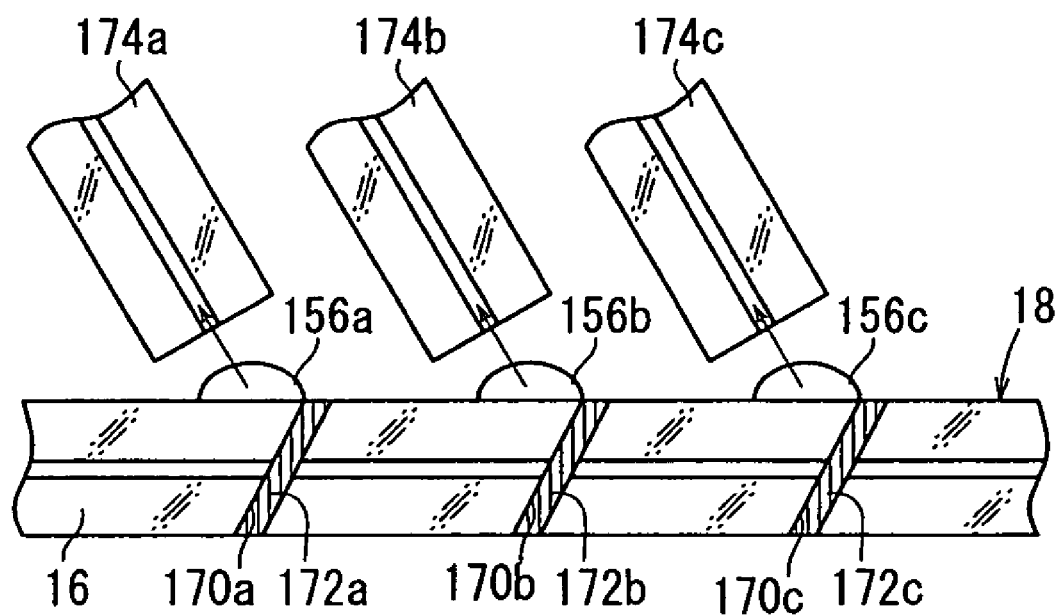
FIG. 24 is a cross-sectional view showing a portion of a monitor according to a seventh modification.

As shown in FIG. 24, a monitor 120g according to a seventh modification includes a plurality of slits 170a, 170b, 170c, . . . defined in each of the optical fibers 16 of the optical fiber array 18, and a plurality of filters 172a, 172b, 172c inserted respectively into the slits 170a, 170b, 170c, . . . . The monitor 120g can also be used as a demultiplexer. Lenses 156a, 156b, 156c, . . . may be disposed in the respective optical paths of branched light. Branched light emitted from the lenses 156a, 156b, 156c, . . . may be applied respectively to individual optical fibers 174a, 174b, 174c, . . . so as to be led to an external circuit system.

Fabrication of an optical device according to an inventive example (Inventive Example 1), which includes the light control means 28A according to the first specific example, shall be described below.

Figure 25:
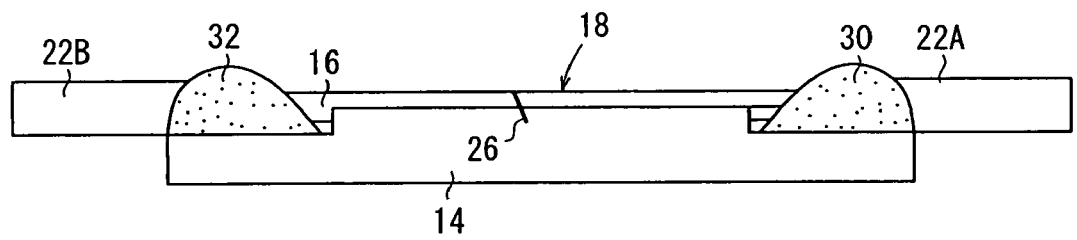
FIG. 25 is a view showing an in-process state in which a slit is formed in an optical fiber array according to the first embodiment.

First, as shown in FIG. 25, a slit 26 was formed in an 8-channel in-line optical fiber array 18. Specifically, eight V-grooves 12 were formed in a glass substrate 14 by grinding. Ribbon fibers peeled off at about 10 mm were mounted in the respective V-grooves 12 using an adhesive. Thereafter, the in-line optical fiber array 18 was slit to form a slit 26 therein.

The slit 26 had a width of about 150 μm. The smaller the width of the slit 26, the more preferable the slit 26 becomes from the standpoint of insertion loss. According to Inventive Example 1, the slit 26 requires a certain width in order for a shutter member 40 to be inserted into the slit 26. However, if the width of the slit 26 is greater than 200 μm, then insertion loss would be noticeably large. The slit 26 should preferably be inclined at an angle of −6° or greater to the vertical direction in order to avoid returning light. In Inventive Example 1, the slit 26 was inclined at an angle of about −8°. The slit 26 had a depth of about 200 μm.

Figure 26:
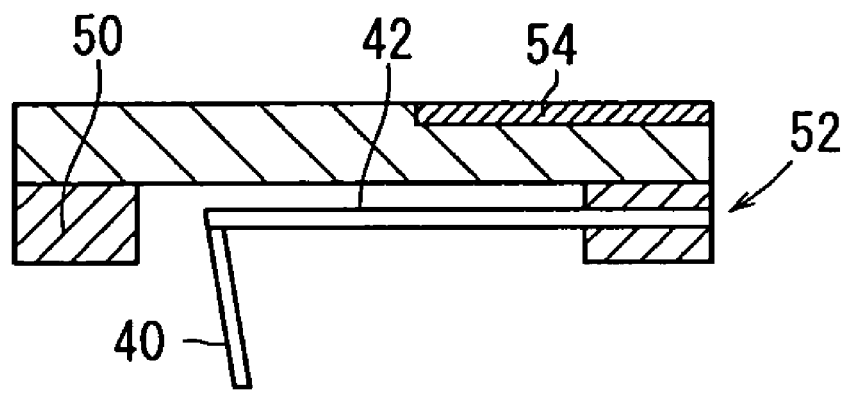
FIG. 26 is a view showing an in-process state in which an actuator is fabricated according to the first embodiment.
Figure 27:
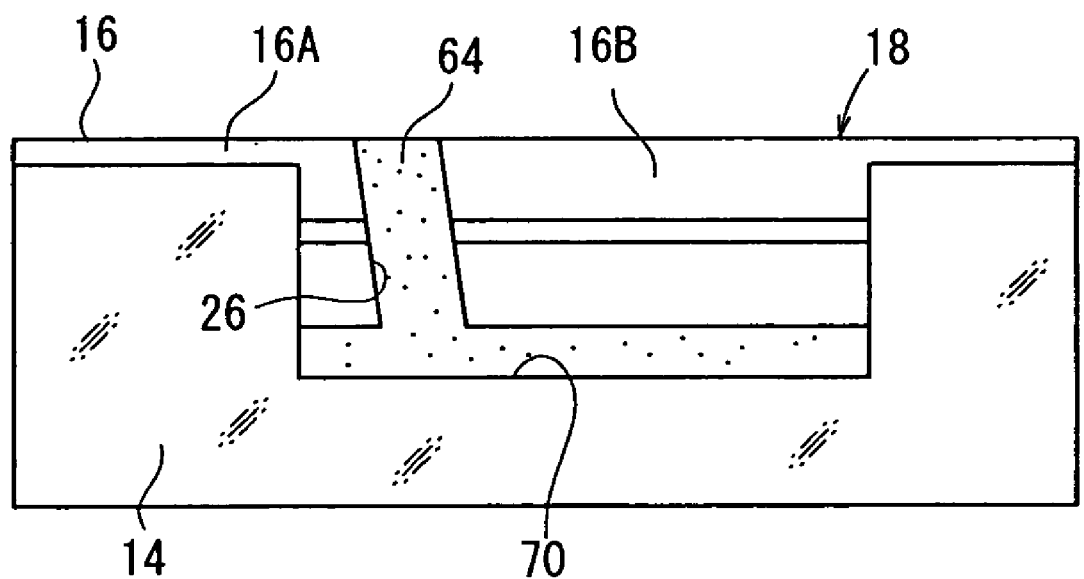
FIG. 27 is a view showing an in-process state in which an optical fiber array is fixed to a glass substrate with a recess defined therein according to the second embodiment.

Then, actuators 42 were fabricated as shown in FIG. 26. The actuators 42 were of a bimorph structure employing a piezoelectric ceramic material. The bimorph structure makes it possible to obtain a large displacement with a low drive voltage. PZT (lead zirconate titanate) was used as the ceramic material. Although the optical device according to Inventive Example 1 primarily serves to block light, the actuators should be made of a crystalline material rather than a ceramic material if the optical device is to attenuate light. The reason is that a ceramic material is not suitable for accurate positioning required by light attenuation, because the ceramic material is displaced by hysteresis. The crystalline material may be LN (lithium niobate) or LT (lithium tantalate). Electrodes are disposed on the upper and lower surfaces of the actuators 42.

The actuators 42 were of a combtooth shape, having a pitch of 250 μm, a thickness of about 200 μm, and a length of about 5 μm. The actuators 42 were spaced at an interval of about 30 μm. If it is tedious and time-consuming to fix the actuators 42 one by one to the second spacer 52, then an actuator blank having a desired width may be fixed to the second spacer 52 and thereafter cut at a desired pitch (e.g., 250 μm).

The shutter member 40 for blocking light needs to be mounted on the tip end portion of each of the actuators 42. According to Inventive Example 1, a light reflecting film 46 (see FIG. 5), in the form of a thin Al film, was formed on the quartz glass 44 and used as the shutter member 40. The light reflecting film 46 may be formed on the light entrance side or the light exit side of the quartz glass 44. The light reflecting film 46 was connected to each of the actuators 42 by an adhesive, but may also be fixed by solder or the like. The shutter member 40 was tilted at an angle of −8° with respect to the vertical direction in order to avoid returning light.

The actuators 42 were secured to the second spacers 52, and mounted on the reverse side (the surface facing the optical fiber array 18) of the wiring board 48 (see FIG. 26). The actuators 42 may be secured in place by an adhesive or by soldering.

Finally, the actuators 42 were mounted on the in-line optical fiber array 18, which had been slit beforehand (see FIG. 39). For mounting the actuators 42, the shutter member 40 is inserted into the slit 26. Then, while confirming the amount of light transmitted through opposite ends of the optical fiber array 18, positional adjustment of the optical fiber array 18 is temporarily stopped when the light starts to be attenuated. Then, the slit 26 is filled with an adhesive 64 of low viscosity. When the slit 26 is completely filled with the adhesive 64, the position of the actuators 42, at which the amount of light transmitted through the opposite ends of the optical fiber array 18 starts to be attenuated even slightly, is confirmed and determined. Finally, the wiring board 48 and the optical fiber array 18 are fixed to each other and the adhesive is cured (see FIG. 3). The wiring board 48 and the optical fiber array 18 may be fixed to each other using an adhesive or solder.

Fabrication of an optical device according to an inventive example (Inventive Example 2), which includes the light control means 28B according to the second specific example, shall be described below.

First, as with Inventive Example 1, a slit 26 was formed in an 8-channel in-line optical fiber array 18. Inventive Example 2 differs in that the optical fibers 16 themselves are movable. Therefore, the optical device according to Inventive Example 2 employed a structure including the slit 26 and which was free of the V-grooves 12 formed below the optical fiber array 18, i.e., with a recess 70 being formed therein (see FIG. 27). As a result, the optical fibers 16 are of a cantilevered structure. The length of the cantilever formed by the optical fibers 16, i.e., the length of the light entrance portion 16B, was about 3 μm. If the length were to exceed 10 μm, then the optical fibers 16 would be axially displaced noticeably. If the length were less than 1 μm, then a large drive force must be applied to displace the light entrance portion 16B. The recess 70 may be filled with an adhesive 64 having low viscosity or a refractive index matching oil. The slit 26 had a width of about 30 μm. According to Inventive Example 2, since, unlike Inventive Example 1, the shutter member 40 is not present within the slit 26, the width of the slit 26 can be reduced, insofar as insertion loss is not impaired. However, if the width of the slit 26 is less than 10 μm, then when the light entrance portion 16B is displaced downwardly, the upper end of the light entrance portion 16B tends to contact the end face of the light exit portion 16A. Therefore, the width of the slit 26 should be specified taking into account such considerations.

Then, the actuators 42 were fabricated. Basically, the actuators 42 were of a bimorph structure, as with Inventive Example 1. Inventive Example 2 differs from Inventive Example 1 in that a shutter member 40 is not required.

Finally, the actuators 42 were secured to the second spacers 52 and mounted on the wiring board 48 (see FIG. 9). The basic adjustment process is the same as that of Inventive Example 1. The actuators 42 and the optical fibers 16 may be bonded to each other. However, if the optical axes of each of the optical fibers 16 tend to shift easily due to differences in the coefficients of thermal expansion of the optical fiber 16 and the actuator 42, then the actuator 42 should not be fixed by an adhesive. A resin-made holding member 72, which is held in contact with the light entrance portion 16B, may be fixed to the lower surface of the tip end portion of the actuator 42 (see FIG. 9)

Fabrication of an optical device according to another inventive example (Inventive Example 3), which has the light control means 28C according to the third specific example, shall be described below.

First, as with Inventive Example 1, a slit 26 was formed in an 8-channel in-line optical fiber array 18. The basic design is the same as the in-line optical fiber array 18 used in Inventive Example 1. In Inventive Example 3, the width of the slit 26, which depends on specifications of the liquid crystal device 80 inserted therein, was 50 μm. Transparent electrodes 98, 100 of ITO (indium tin oxide) were employed for energizing the liquid crystal device 80. Specifically, as shown in FIGS. 13 and 14, transparent electrodes 98 were grown from the end face to the upper surface of the light exit portion 16A, and transparent electrodes 100 were grown from the end face to the upper surface of the light entrance portion 16B. In particular, the in-line optical fiber array 18 according to Inventive Example 3 is of a structure free of an adhesive on upper portions of the optical fibers 16. Therefore, the electrodes can be grown directly on the quartz optical fibers 16.

Then, the liquid crystal device 80 was inserted into the slit 26. Although various liquid crystal devices are available, a polymer-dispersed liquid crystal device was employed in Inventive Example 3. The liquid crystal device 80 was fixed in place by a refractive index matching adhesive.

Then, the wiring board 48 was mounted in place. Separate electrode patterns 54 associated with the respective channels, and a single common electrode pattern 56, were disposed on the upper surface of the wiring board 48. Through holes 102, 104 were defined in the wiring board 48 at positions corresponding to the electrode patterns 54, 56.

With the wiring board 48 disposed over the slit 26, the transparent electrodes 98 on upper surfaces of the light exit portions 16A and the electrode patterns 54 were electrically connected to each other through the electrically conductive layers 106 and the through holes 102. Further, the transparent electrodes 100 on upper surfaces of the light entrance portions 16B and the common electrode pattern 56 were electrically connected to each other through the electrically conductive layers 108 and the through holes 104. The electrically conductive layers 106, 108 may be made of solder, anisotropic electrically conductive paste, or the like. In Inventive Example 3, the electrodes were connected using the wiring board 48, although the electrodes may be connected using flexible cables.

If an organic product, such as a polymer-dispersed liquid crystal device, is employed and humidity resistance needs to be increased, then a simple encasing structure may be employed. As shown in FIG. 16, in the simple encasing structure, the slit 26 below the wiring board 48 and the optical fiber array 18 near the slit 26 are encased in a humidity-resistant resin layer 110 (formed of an epoxy or the like). For higher humidity resistance, an encasing adhesive may be used partially or entirely as the fixing adhesive 74, which is used to secure the optical fiber array 18 within the V-grooves 12.

The optical device according to the present invention is not limited to the above embodiments, but may employ various structural details without departing from the gist of the present invention as set forth in the appended claims.

What is claimed is:

1. An optical device comprising:
   an optical fiber array having at least one optical fiber, said at least one optical fiber being fixed to said optical fiber array by a first adhesive;
   a slit defined in an optical path of said optical fiber array, wherein said slit is filled with a second adhesive that functions as a refractive index matching agent; and
   a light control means disposed in or near said slit for attenuating or blocking light that is propagated through said optical path of said optical fiber array,
   wherein said at least one optical fiber of said optical fiber array has a portion for emitting light into said slit, which is defined as a light exit portion, and a portion for receiving light through said slit, which is defined as a light entrance portion, and said light control means comprises an actuating means for elastically deforming said light exit portion and/or said light entrance portion in order to shift an optical axis thereof, and
   wherein said first adhesive is more viscous than said second adhesive and functions as a cushioning member to reduce stress concentrations at a pivot point of said at least one optical fiber.

2. An optical device according to claim 1, further comprising:
   a base having at least one V-groove defined therein, said optical fiber array being disposed in said V-groove;
   said base having a recess defined in a portion thereof where said slit of said optical fiber array is positioned; and
   said recess has a bottom positioned downwardly of a lower surface of said optical fiber array.

3. An optical device according to claim 2, wherein an adhesive for fixing the optical fiber is provided in a boundary region between said recess and said light exit portion and in a boundary region between said recess and said light entrance portion.

4. An optical device according to claim 1, further comprising:
   a monitor for detecting branched light from signal light that is propagated through an optical path of said optical fiber array and converting the detected branched light into an electric signal depending on an intensity of said branched light; and
   said light control means controls said signal light that is propagated through the optical path of said optical fiber array based on the electric signal from said monitor.

5. An optical device comprising:
   an optical fiber array having at least two optical fibers defining two channels, wherein each of said at least two optical fibers of said optical fiber array has a light exit portion for emitting light into a slit defined in an optical path of said optical fiber array, and a light entrance portion for receiving light through said slit
   light control means comprising a liquid crystal device disposed in or near said slit for attenuating or blocking light that is propagated through the optical path of said optical fiber array, wherein said liquid crystal device, whose transparency changes depending on an electric signal applied thereto, has a separate cell and transparent electrode associated with each channel;
   a first transparent electrode disposed on at least an upper surface of said light exit portion and electrically connected to a transparent electrode of said liquid crystal device;
   a second transparent electrode disposed on at least an upper surface of said light entrance portion and electrically connected to another transparent electrode of said liquid crystal device, and
   a board disposed over said slit of said optical fiber array, said board comprising:
      a first upper electrode and a second upper electrode disposed on an upper surface thereof;
      a first through hole electrically connecting said first transparent electrode to said first upper electrode; and
      a second through hole electrically connecting said second transparent electrode to said second upper electrode.

6. An optical device according to claim 5, further comprising:
   a monitor for detecting branched light from signal light that is propagated through an optical path of said optical fiber array and converting the detected branched light into an electric signal depending on an intensity of said branched light; and
   said light control means controls said signal light that is propagated through said optical fiber array based on the electric signal from said monitor.

7. An optical device comprising:
   an optical fiber array having at least two optical fibers defining two channels, wherein each of said at least two optical fibers of said optical fiber array has a light exit portion for emitting light into a slit defined in an optical path of said optical fiber array, and a light entrance portion for receiving light through said slit;
   light control means comprising a liquid crystal device disposed in or near said slit for attenuating or blocking light that is propagated through the optical path of said optical fiber array, wherein said liquid crystal device, whose transparency changes depending on an electric signal applied thereto, has a separate cell and transparent electrode associated with each channel;
   a first transparent electrode disposed on at least an upper surface of said light exit portion and electrically connected to a transparent electrode of said liquid crystal device;
   a second transparent electrode disposed on at least an upper surface of said light entrance portion and electrically connected to another transparent electrode of said liquid crystal device, and
   a resin layer disposed in covering relation to at least an electric junction between said first transparent electrode and said transparent electrode of said liquid crystal device and an electric junction between said second transparent electrode and said another transparent electrode of said liquid crystal device.

8. An optical device according to claim 7, further comprising:
   a monitor for detecting branched light from signal light that is propagated through an optical path of said optical fiber array and converting the detected branched light into an electric signal depending on an intensity of said branched light; and
   said light control means controls said signal light that is propagated through said optical fiber array based on the electric signal from said monitor.

* * * * *